(12) United States Patent
Cho et al.

(10) Patent No.: US 9,720,107 B2
(45) Date of Patent: Aug. 1, 2017

(54) METHOD AND APPARATUS FOR DIFFERENTIALLY DETECTING BETA RAYS AND GAMMA RAYS INCLUDED IN RADIO ACTIVE RAYS AND PACKAGE COMPRISING THE APPARATUS

(71) Applicant: Samsung Electronics Co., Ltd., Gyeonggi-do (KR)

(72) Inventors: Shin-hee Cho, Gyeonggi-do (KR); In-geol Baek, Gyeonggi-do (KR); Jae-geol Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 87 days.

(21) Appl. No.: 14/883,011

(22) Filed: Oct. 14, 2015

(65) Prior Publication Data
US 2016/0116609 A1    Apr. 28, 2016

(30) Foreign Application Priority Data

Oct. 24, 2014 (KR) .................. 10-2014-0145392

(51) Int. Cl.
*G01T 1/24* (2006.01)
*G01T 1/02* (2006.01)

(52) U.S. Cl.
CPC .............. *G01T 1/242* (2013.01); *G01T 1/026* (2013.01); *G01T 1/244* (2013.01); *G01T 1/247* (2013.01)

(58) Field of Classification Search
CPC .......... G01T 1/247; G01T 1/242; G01T 1/244
See application file for complete search history.

(56) References Cited

U.S. PATENT DOCUMENTS

| 5,008,546 A | * | 4/1991 | Mazziotta | ............... | A61B 6/425 250/366 |
| 5,932,879 A | * | 8/1999 | Raylman | ............... | A61B 6/425 250/367 |

(Continued)

FOREIGN PATENT DOCUMENTS

| KR | 100372755 | 2/2003 |
| KR | 100641369 | 10/2006 |

OTHER PUBLICATIONS

International Search Report dated Jan. 18, 2016 issued in counterpart application No. PCT/KR2015/010846, 9 pages.

*Primary Examiner* — Marcus Taningco
(74) *Attorney, Agent, or Firm* — The Farrell Law Firm, P.C.

(57) ABSTRACT

Methods, apparatuses, and methods for manufacturing apparatuses that differentially detect beta and/or gamma rays are described. One radiation sensor described herein has operational amplifier(s), two blocking layers capable of blocking beta rays, and two photodiodes. The first photodiode is disposed between the blocking layers and thus isolated from incident beta rays. Accordingly, the first photodiode is capable of detecting gamma rays and providing a current corresponding to detected gamma rays to an operational amplifier. The second photodiode is disposed on one of the blocking layers and is capable of detecting beta rays and gamma rays and providing current corresponding to detected beta and/or gamma rays to an operational amplifier. The operational amplifiers convert the currents into voltage pulses which are used to, for example, determine if beta and/or gamma rays are detected and the amount/level of detected rays.

16 Claims, 22 Drawing Sheets

(56) References Cited

U.S. PATENT DOCUMENTS

| | | | |
|---|---|---|---|
| 6,076,009 A * | 6/2000 | Raylman | A61B 6/425 250/303 |
| 6,149,593 A * | 11/2000 | Gonzalez-Lepera | A61B 6/00 250/303 |
| 8,068,896 B2 * | 11/2011 | Daghighian | A61B 6/037 250/252.1 |
| 2009/0039271 A1 | 2/2009 | Farsoni et al. | |
| 2009/0108212 A1 | 4/2009 | Gordon et al. | |
| 2013/0277565 A1 | 10/2013 | Bogorodzki et al. | |
| 2013/0320220 A1 | 12/2013 | Donowsky | |

* cited by examiner

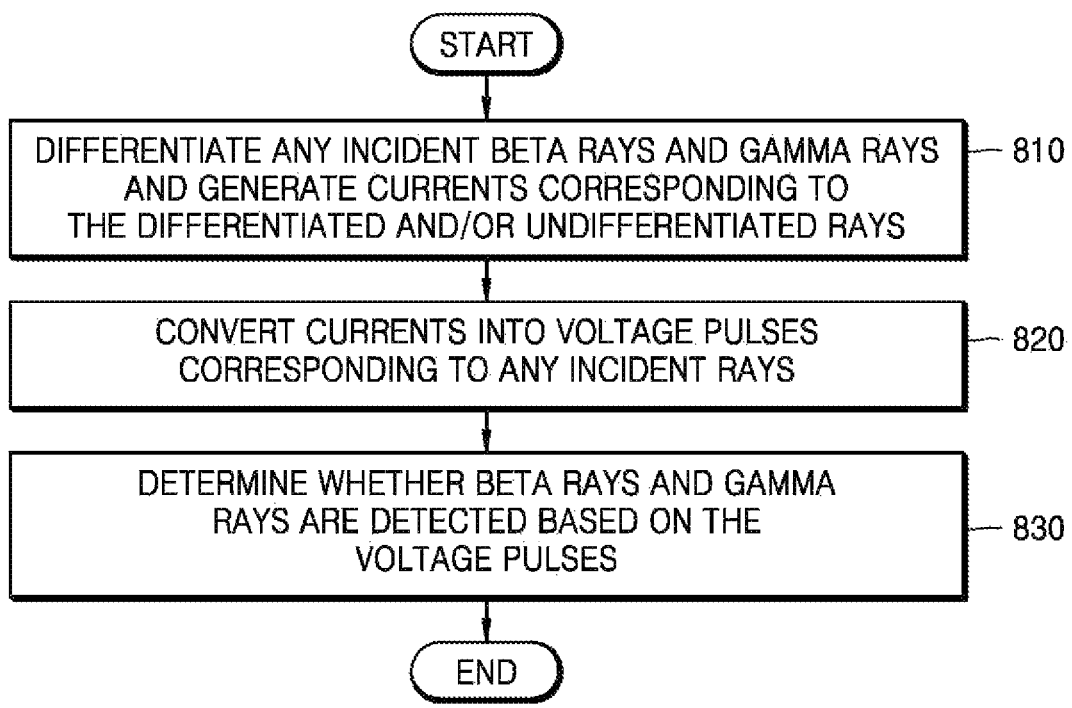

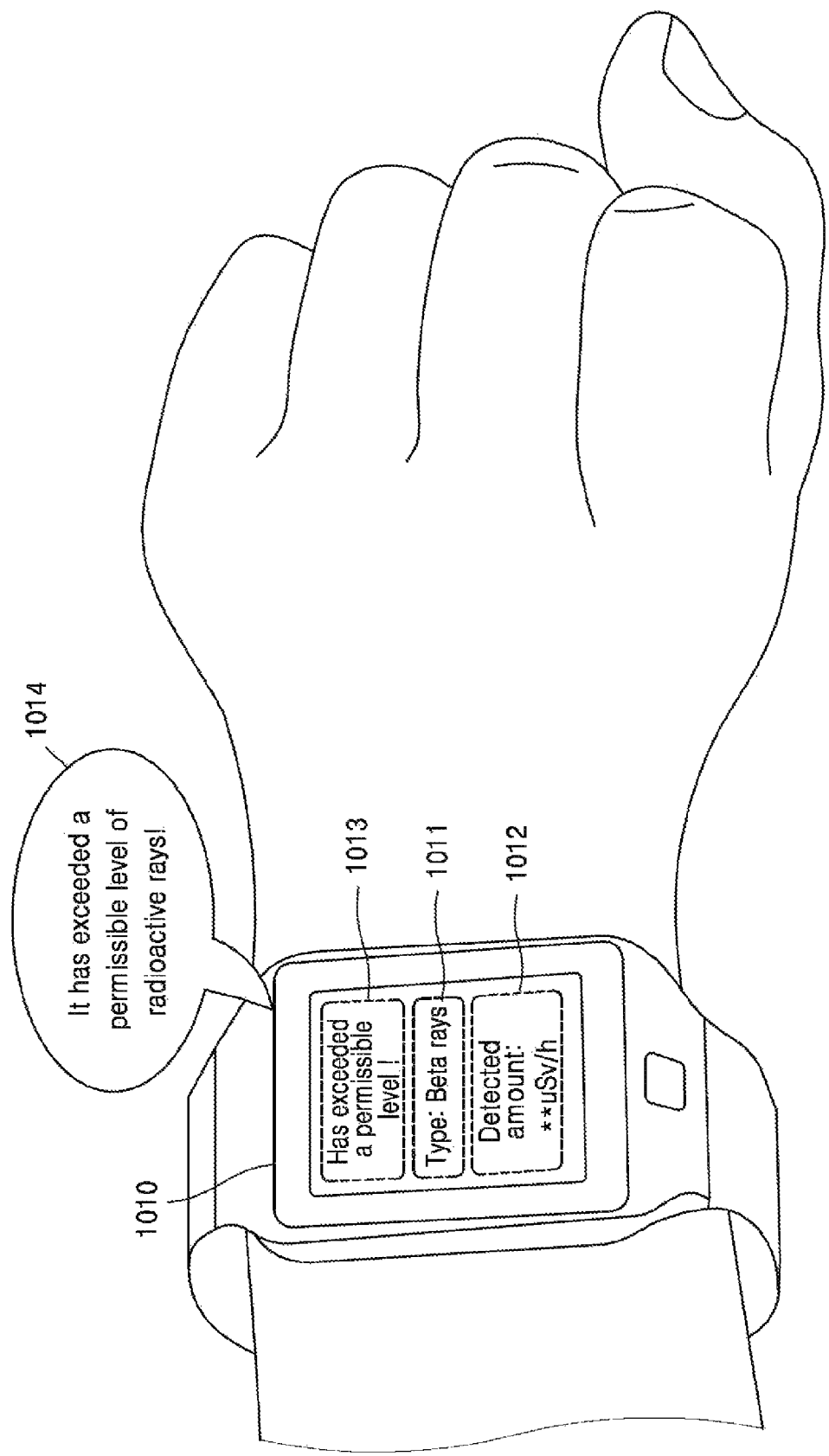

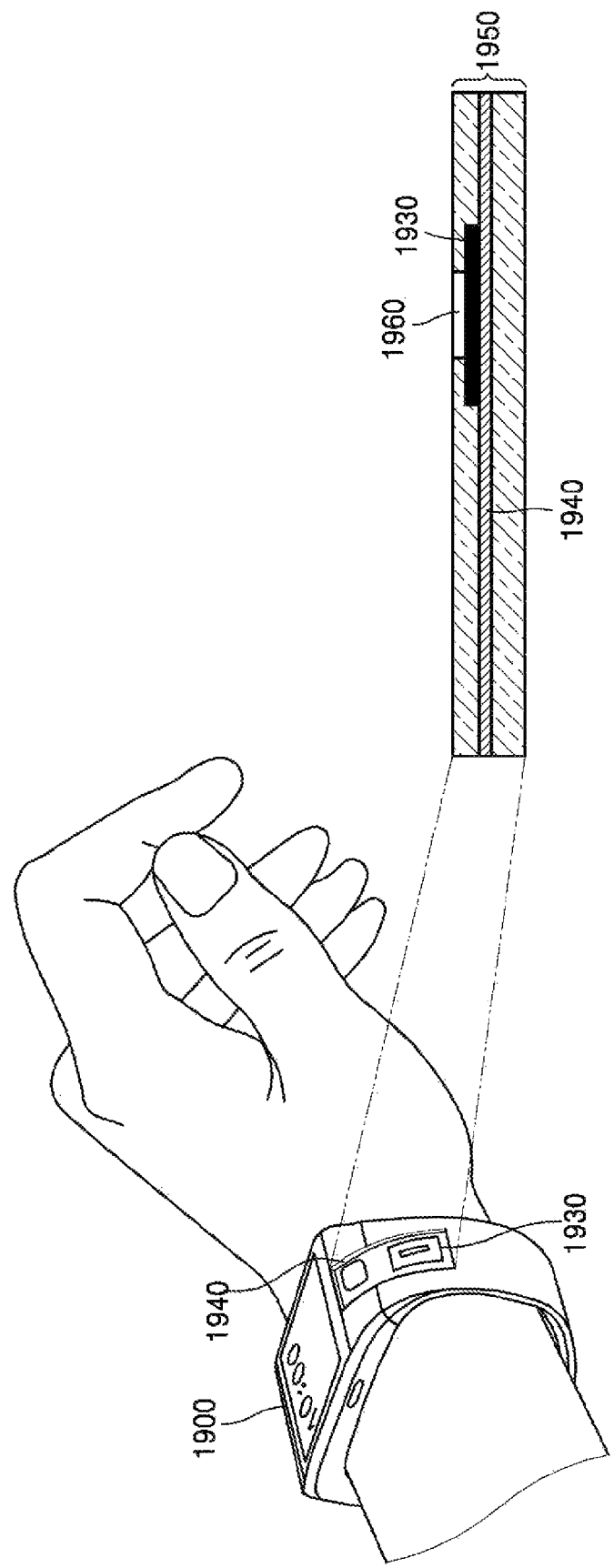

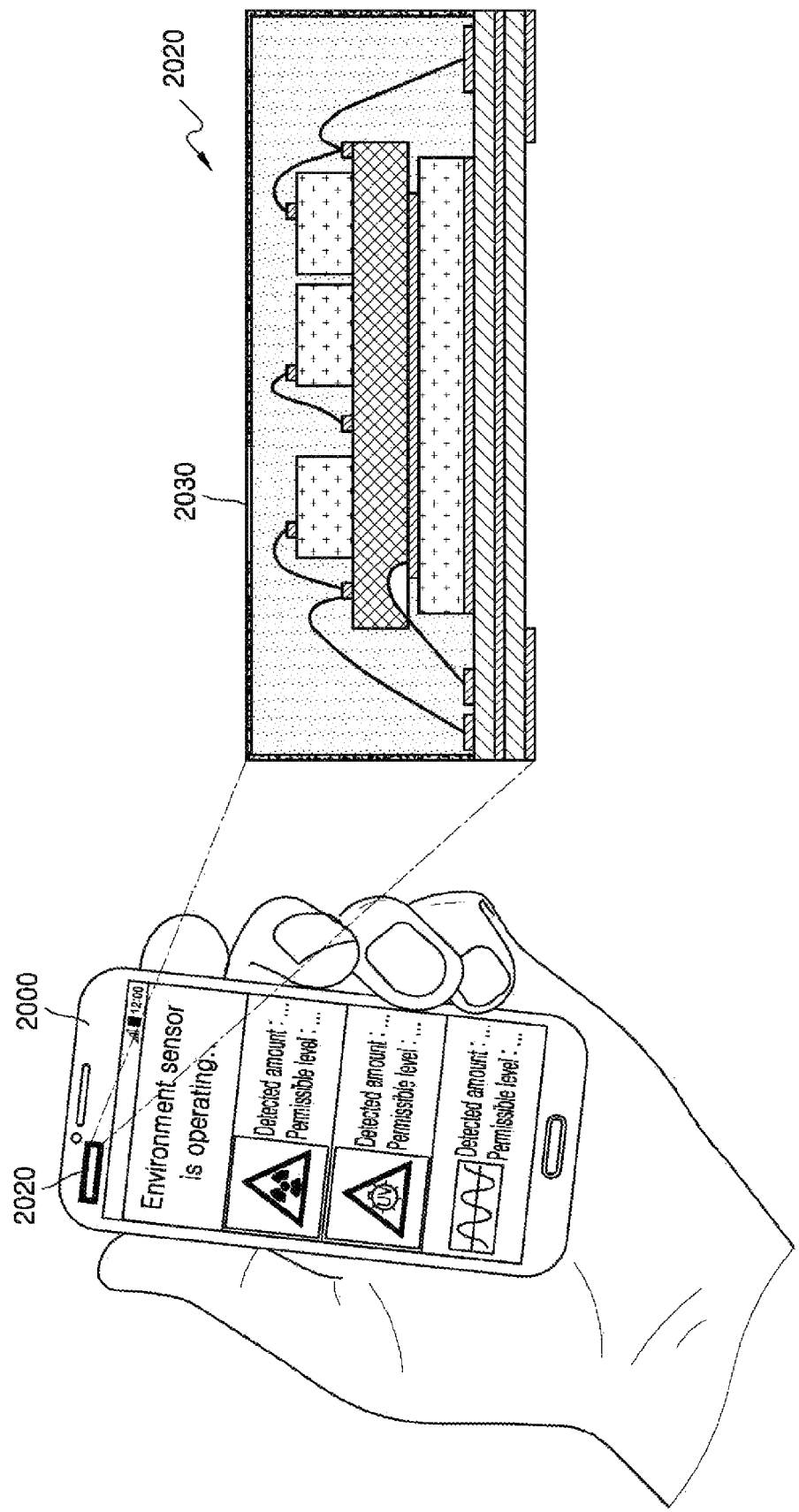

METHOD AND APPARATUS FOR DIFFERENTIALLY DETECTING BETA RAYS AND GAMMA RAYS INCLUDED IN RADIO ACTIVE RAYS AND PACKAGE COMPRISING THE APPARATUS

PRIORITY

This application claims priority under 35 U.S.C. §119(a) to Korean Patent Application No. 10-2014-0145392, which was filed on Oct. 24, 2014 in the Korean Intellectual Property Office, the contents of which are incorporated herein by reference.

BACKGROUND

1. Field of the Disclosure

The present disclosure relates generally to methods, apparatuses, and methods to manufacture apparatuses for differentially detecting beta and gamma rays and, more specifically, to providing a radioactive sensor package for a mobile terminal.

2. Description of the Related Art

As public interest in healthy living increases, devices for monitoring harmful materials (e.g., radioactive rays, ultraviolet rays, or electromagnetic (EM) waves) that could pose a threat to health or safety are being developed. In particular, radiation sensors for integrally detecting various radioactive rays have recently been developed. However, the structure of radiation sensors is complex and costly to manufacture.

Accordingly, technologies for miniaturizing and integrally mounting such sensors (e.g., infrared or radiation sensors) for detecting a harmful material on a mobile terminal (e.g., a smart phone or a wearable device) need to be developed.

SUMMARY

The present invention addresses at least the issues discussed above and provides at least the advantages described below. An aspect of the invention provides a method and apparatus for differentially detecting beta rays and gamma rays, as well as a method of manufacturing the apparatus. According to one aspect of the present invention, a package including at least a radiation sensor is provided.

Another aspect of the present invention provides one or more non-transitory computer-readable recording media having instructions thereon which may be used for executing methods, portions of methods, and any other processes according to embodiments of the present invention.

According to one aspect of the present invention, a sensor capable of differentially detecting beta rays and gamma rays is provided, the sensor including at least one operational amplifier; a first blocking layer that blocks transmission of beta rays; a second blocking layer that blocks transmission of beta rays; a first photodiode that is disposed between the first blocking layer and the second blocking layer and is capable of detecting gamma rays and providing current corresponding to detected gamma rays to the at least one operational amplifier; and a second photodiode that is disposed on the first blocking layer and is capable of detecting beta rays and gamma rays and providing current corresponding to detected beta and/or gamma rays to the at least one operational amplifier.

According to another aspect of the present invention, a method of detecting radioactive rays is provided, the method including differentiating beta rays and gamma rays included in incident radioactive rays; generating voltage pulses corresponding to at least the beta rays; generating voltage pulses corresponding to the gamma rays; and determining whether at least one of beta rays and gamma rays is detected based on the generated voltage pulses.

According to yet another aspect of the present invention, a package is provided, including a first sensor capable of differentially detecting beta rays and gamma rays included in incident radioactive rays; an interposer; and a second sensor that is disposed on one side of the interposer wherein the first sensor is located on the other side of the interposer.

According to still another aspect of the present invention, a device is provided which includes an output unit and a sensor capable of detecting radioactive rays, the sensor including at least one operational amplifier; a first blocking layer that blocks transmission of beta rays; a second blocking layer that blocks transmission of beta rays; a first photodiode that is disposed between the first blocking layer and the second blocking layer and is capable of detecting gamma rays and providing current corresponding to detected gamma rays to the at least one operational amplifier; and a second photodiode that is disposed on the first blocking layer and is capable of detecting beta rays and gamma rays and providing current corresponding to detected beta and/or gamma rays to the at least one operational amplifier.

According to still yet another aspect of the present invention, a portable device is provided which includes a package including a first sensor that is capable of differentially detecting beta rays and gamma rays included in rays incident on the portable device; an interposer; and a second sensor that is disposed on one side of the interposer and the first sensor is located on the other side of the interposer.

BRIEF DESCRIPTION OF THE DRAWINGS

The above and other features, advantages, and/or aspects will become apparent and more readily appreciated from the following detailed description, when taken in conjunction with the accompanying drawings in which:

FIG. 8 is a flowchart of a method of differentially detecting beta and gamma rays according to an embodiment of the present invention;

FIGS. 10A through 10C show examples of information, such as warning signals, output from an output unit according to embodiments of the present invention;

FIGS. 19A and 19B are views of a wearable device which includes an environment sensor package according to an embodiment of the present invention; and FIGS. 20A and 20B are views of a mobile device which includes an environment sensor package according to an embodiment of the present invention.

DETAILED DESCRIPTION

Figure 1:
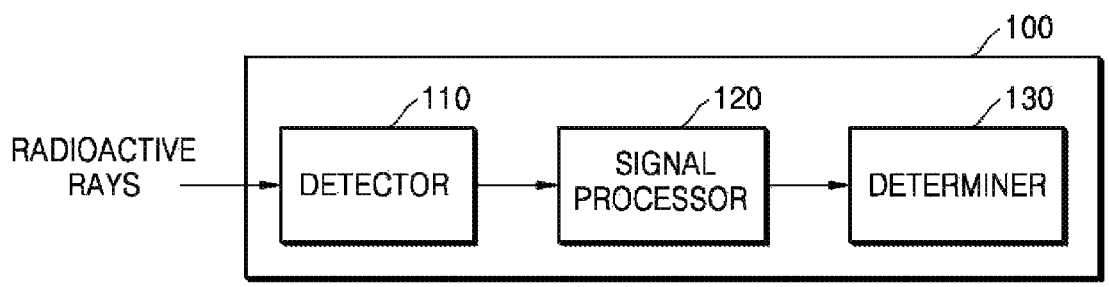
FIG. 1 is a block diagram of an apparatus for detecting radioactive rays according to an embodiment of the present invention.

Embodiments of the present invention are described in detail below with reference to the accompanying drawings. Same or similar components may be designated by the same or similar reference numerals although they are illustrated in different drawings. Detailed descriptions of constructions or processes known in the art may be omitted to avoid obscuring the subject matter of the present invention and/or as already known to any of ordinary skill in the art. The embodiments described within are for purposes of description and/or explanation, and the present invention is not limited to any or all of the embodiments described herein, but rather includes at least all modifications, equivalents, and/or alternatives thereto.

As used herein, the term "and/or" includes any and all combinations of one or more of the associated listed items. Expressions such as "at least one of," when preceding a list of elements, modify the entire list of elements and do not modify the individual elements of the list.

Radioactive rays are emitted from radioactive atoms, and include alpha rays, beta rays, gamma rays, X-rays, and neutron rays. Radioactive rays may be artificially generated by, for example, medical diagnostic devices or nuclear power generators, or naturally generated by animals, plants, or minerals buried in the ground.

Alpha rays travel only a short distance from a source and may be easily blocked by a thin blocking film (e.g., paper), so it is difficult to detect alpha rays.

Beta particles refer to high-energy, high-speed electron or positron particles that are emitted by radioactive nuclei such as potassium-40. Beta particles emitted as ionizing radioactive rays are also known as beta rays, and the process of producing beta particles is termed beta decay. In general, although beta particles may travel several meters in air, beta particles may be blocked by using a thin piece of metal, such as aluminum.

Gamma rays are electromagnetic (EM) waves which can travel hundreds of meters and have high penetrating power. Unlike alpha and beta rays, gamma rays can only be blocked by thick layers of lead or heavy concrete walls.

In one embodiment of the present invention, a sensor capable of differentially detecting beta rays and gamma rays has one or more operational amplifiers, two blocking layers (each capable of blocking beta rays), and two photodiodes. The first photodiode is disposed between the blocking layers and thus isolated from incident beta rays. Accordingly, the first photodiode is capable of detecting gamma rays and providing a current corresponding to detected gamma rays to an operational amplifier. The second photodiode is disposed on one of the blocking layers and is capable of detecting beta rays and gamma rays and providing current corresponding to detected beta and/or gamma rays to an operational amplifier.

The details regarding the components will vary in accordance to the purposes and requirements of the particular implementation. For example, the blocking layers may include a metal layer and be stacked on a silicon wafer or a printed circuit board (PCB). The metal layer may be formed of any suitable metal, including, but not limited to, aluminum (Al), copper (Cu), gold (Au), and/or silver (Ag).

The sensor may further include a substrate. The substrate may be formed from any suitable material, including, but not limited to, a low temperature co-fired ceramic (LTCC) substrate and/or a high temperature co-fired ceramic (HTCC) substrate. The substrate may be a PCB. One or more pads may be connected to the substrate, or another suitable portion of the sensor, where the pads may form particular structures/patterns, including, but not limited to, a ball grid array (BGA), a land grid array (LGA), and/or a quad flat no-lead (QFN).

The one or more operational amplifiers connected to the first photodiode and the second photodiode convert the currents generated by the first and second photodiodes into voltages. The sensor may further include a processor that determines whether the detected beta rays or the detected gamma rays exceed a permissible level.

In one embodiment of the present invention, beta rays and gamma rays included in incident radioactive rays are differentiated, voltage pulses corresponding to at least any incident beta rays are generated, and voltage pulses corresponding to any incident gamma rays are generated. Whether at least one of beta rays and gamma rays is detected is determined based on the generated voltage pulses.

In one embodiment of the present invention, a package includes an interposer, a first sensor located on one side of the interposer is capable of differentially detecting beta rays and gamma rays included in incident radioactive rays, and a second sensor that is disposed on the other side of the interposer.

The interposer may include a layer that blocks transmission of electromagnetic (EM) waves, one or more pads, a re-wiring pattern for die bonding or wire bonding, and an antenna pattern that receives a radio frequency (RF) signal or EM waves.

The package may include a substrate that is connected to the first sensor, the interposer, and the second sensor. The substrate may be a printed circuit board (PCB), a low temperature co-fired ceramic (LTCC) substrate, or a high temperature co-fired ceramic (HTCC) substrate, and may include a metal layer that blocks transmission of any incident beta rays.

The package may include a plurality of pads on the outside of the package, and the plurality of pads may have the structure of a ball grid array (BGA), a land grid array (LGA), or a quad flat no-lead (QFN). The package may further include a coating on at least one surface that blocks transmission of electromagnetic (EM) waves.

The second sensor may be an ultraviolet detector. In such a case, the molding material of the package, or at least the portion of the molding material adjacent to the ultraviolet detector, may be transparent to ultraviolet rays. In some embodiments, the second sensor may detect ultraviolet rays indirectly, i.e., by detecting light which passes through at least the portion of the molding material adjacent to the second sensor, where the color/transparency of at least that portion varies based on the amount of the ultraviolet rays incident upon it.

In some embodiments, information is output to the user. Such information may include a warning signal when the detected beta or gamma rays exceed a permissible level, information about a shelter where the user may not be exposed to radioactive rays, or general information regarding past and/or current radiation detection.

FIG. 1 is a block diagram of an apparatus 100 for detecting radioactive rays according to an embodiment. Only elements of apparatus 100 related to the present embodiment are illustrated in FIG. 1. Accordingly, it will be understood by one of ordinary skill in the art that the apparatus 100 may further include general-purpose elements other than the elements of FIG. 1.

Apparatus 100 in FIG. 1 includes a detector 110, a signal processor 120, and a determiner 130. Some of the components in apparatus 100, such as signal processor 120 and/or determiner 130, may comprise one or more processors. Each processor may include a combination of general-purpose microprocessor and memory in which programs that may be executed in the microprocessor are stored. One of ordinary skill in the art knows that a processor is another type of hardware.

The detector 110 differentiates beta rays and gamma rays that are incident on the apparatus 100. In some embodiments, the beta rays and the gamma rays are differentiated and detected using photodiodes and blocking elements.

In one embodiment, detector 110 includes at least two photodiodes and at least two chips that block the transmission of beta rays ("blocking chips"). The photodiodes and the chips are alternately stacked. Each of the blocking chips may be a package in which a metal layer is stacked on a silicon wafer. Any metal that blocks beta rays may comprise the metal layer including, but not limited to, aluminum (Al), copper (Cu), gold (Au), and silver (Ag). Detector 110 generates currents corresponding to any incident beta and/or gamma rays.

Signal processor 120 converts the currents corresponding to any incident beta and/or gamma rays generated by detector 110 into voltage pulses. Signal processor 120 may also amplify or reduce the voltage pulses to make them suitable for further processing. Signal processor 120 may include one or more operational amplifier (OP-AMP) connected to at least one passive element. The passive element coupled to the OP-AMP may be a resistor (R) or a capacitor (C).

Determiner 130 determines whether beta and/or gamma rays are detected using the voltage pulse signals generated by signal processor 120. Determiner 130 may also determine other information, such as the level/amount of detected beta and/or gamma rays.

An external molding may cover one or more of the detector 110, the signal processor 120, and determiner 130. Molding refers to a process of surrounding components (e.g., detector 110 and signal processor 120) using a suitable molding material. Molding may be performed, for example, by heating and melting an epoxy molding compound (EMC) at a predetermined temperature (e.g., about 180° C.) and coating the components on a substrate.

Figure 2A:
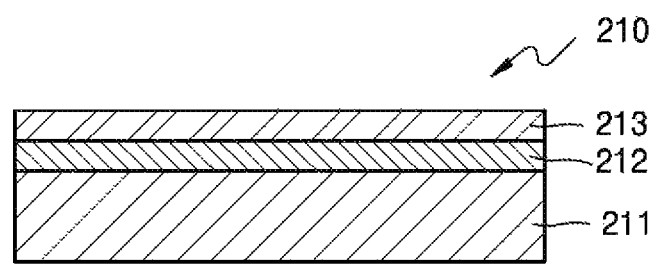
FIGS. 2A and 2B are cross-sectional views of blocking chips that may be included in a detector according to embodiments of the present invention.
Figure 2B:
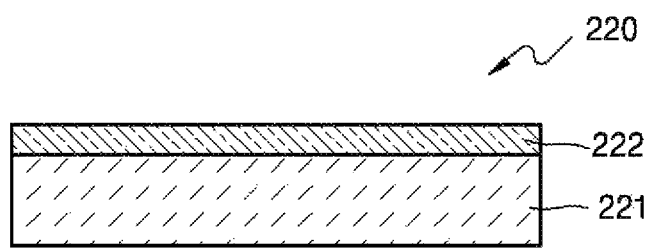

FIGS. 2A and 2B are cross-sectional views of blocking chip 210 and blocking chip 220, respectively, that may be included in a detector according to embodiments. The chips in each of FIGS. 2A and 2B have a stacked metal layer. As mentioned above, beta rays/particles may be blocked by a thin piece of metal. Accordingly, the metal layer (e.g., aluminum layer 213 or copper layer 222) in either of blocking chips 210 or 220 may block transmission of beta rays.

Referring to FIG. 2A, blocking chip 210 is formed by stacking layers on silicon wafer 211. Specifically, silicon dioxide layer 212 is stacked on silicon wafer 211 and aluminum layer 213 is then stacked on the silicon dioxide layer 212. The stacking of the silicon dioxide layer 212 is optional, and thus may be omitted.

Referring to FIG. 2B, blocking chip 220 is formed by stacking copper layer 222 on a dielectric material 221. The dielectric material 221 may be an electrical insulator that is polarized by an electric field applied thereto. For example, the dielectric material 221 may be, but is not limited to, silicon dioxide.

Although the metal layer for blocking transmission of beta rays in FIGS. 2A and 2B is comprised of aluminum and copper, respectively, the present embodiments are not limited thereto. For example, other metals capable of blocking beta rays may be used or other materials capable of blocking beta rays, such as plastic, may also be used.

Figure 3:
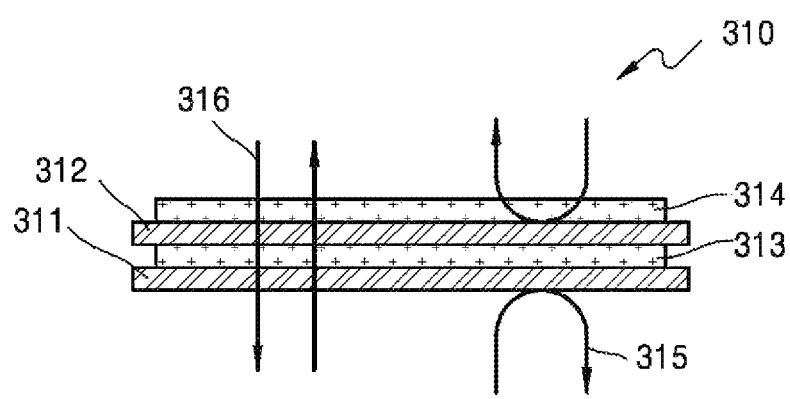
FIG. 3 is a cross-sectional view of a package which may be used in/as a detector according to an embodiment of the present invention.

FIG. 3 is a cross-sectional view of a package which may be used in/as a detector according to an embodiment.

Package 310 in FIG. 3 has two beta-ray blocking chips, i.e., first and second beta-ray blocking chips 311 and 312, and two photodiodes, i.e., first and second photodiodes 313 and 314, stacked together. More specifically, package 310 is formed by alternately stacking the beta-ray blocking chips 311 and 312 and photodiodes 313 and 314. In other words, the package 310 is formed by stacking the first photodiode 313 on the first beta-ray blocking chip 311, stacking the second beta-ray blocking chip 312 on the first photodiode 313, and stacking the second photodiode 314 on the second beta-ray blocking chip 312. The photodiodes may be PIN or PN diodes.

The detector differentiates incident beta rays 315 and gamma rays 316 by using the fact that the incident gamma rays 316 may traverse the entire package 310 whereas the incident beta rays 315 may be blocked by the first and second beta-ray blocking chips 311 and 312. That is, the metal layer included in each of the first and second beta-ray blocking chips 311 and 312 block transmission of the beta rays 315 but cannot block transmission of the gamma rays 316. Accordingly, the detector 110 may differentially detect the beta rays 315 and the gamma rays 316 by using the first and second photodiodes 313 and 314 that are alternately stacked with the first and second beta-ray blocking chips 311 and 312.

For example, as shown in FIG. 3, both the beta rays 315 and the gamma rays 316 pass through the second photodiode 314. Accordingly, the second photodiode 314 generates a photocurrent corresponding to the beta rays 315 and gamma rays 316. Next, beta rays 315 do not pass through the second beta-ray blocking chip 312, but gamma rays 316 do pass through the second beta-ray blocking chip 312. Accordingly, the first photodiode 313 generates a photocurrent corresponding to the gamma rays 316 that pass through it. Thus, the detector may differentiate and detect the beta rays 315 and the gamma rays 316 by using the photocurrents generated by the first and second photodiodes 313 and 314.

Alternatively, as also shown in FIG. 3, the radioactive rays may come from the opposite side of package 310 and are thus first incident on the first beta-ray blocking chip 311. In this case, the beta rays 315 do not pass through the first blocking chip 311, while gamma rays 316 do. Accordingly, each of the photodiodes generates a photocurrent corresponding to the gamma rays 316, while neither of the photodiodes generates a photocurrent corresponding to the blocked beta rays 315. Thus, the detector 110 may detect the gamma rays 316 by using the photocurrent that is generated by the first photodiode 313 and the photocurrent that is generated by the second photodiode 314.

The sensitivity of a photodiode is proportional to its light-receiving surface area. In other words, as the surface area increases, the amount of rays detected by the photodiode increases. However, even if the surface area of a photodiode is necessarily reduced, the use of two or more stacked reduced-size photodiodes effectively increases the overall sensitivity of the detector. Accordingly, even though the areas of the first and second photodiodes 313 and 314 that are included in the package 310 may be reduced, the same effect may be obtained by stacking the first and second photodiodes 313 and 314 to compensate for the reduction in surface area. For example, the amount of gamma rays detected by a single photodiode having an area of 1 and the amount of gamma rays detected by a stack of two photodiodes each having an area of ½ are the same. Accordingly, since the width of the package 310 that is illustrated as a detector may be reduced by stacking photodiodes instead of using a wider single-layer photodiode, the size of an apparatus according to embodiments of the present inventions may be reduced.

As discussed in reference to FIG. 1, the signal processor receives currents corresponding to any incident beta and/or gamma rays and converts the currents into voltage pulses. In FIG. 3, the photocurrents generated by the first and second photodiodes 313 and 314 would be transmitted to the signal processor. In this case, the signal processor would convert the photocurrents into voltage pulses, and may further amplify or reduce the voltage pulses to levels high or low enough to be processed in the apparatus.

The signal processor may be connected to package 310 (which corresponds to detector) to form one package. An example of a package in which the detector and the signal processor are coupled to each other is discussed below with reference to FIG. 4.

Figure 4:
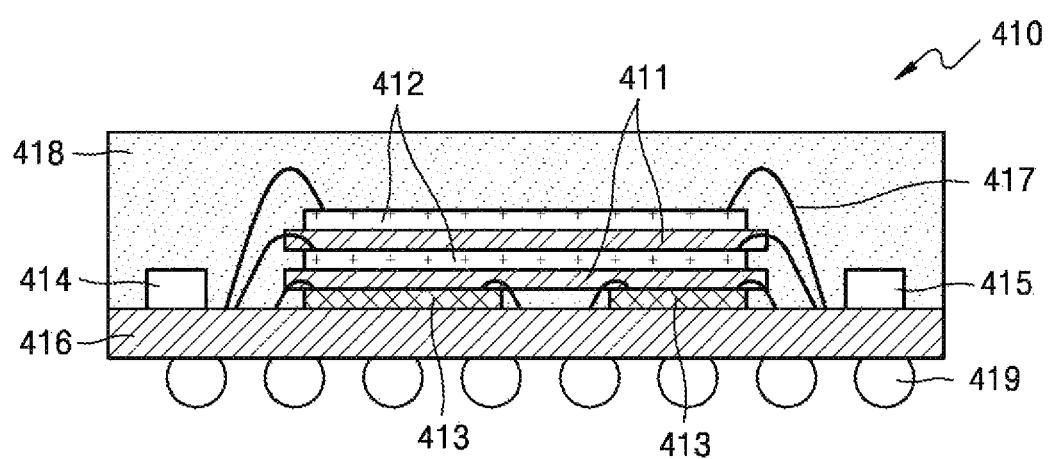
FIG. 4 is a cross-sectional view of a package in which a detector and a signal processor are coupled to each other according to an embodiment of the present invention.

FIG. 4 is a cross-sectional view of a package 410 in which a detector and a signal processor are coupled to each other according to an embodiment.

Package 410 in FIG. 4 includes a detector formed by alternately stacking two beta-ray blocking chips 411 and two photodiodes 412 and a signal processor including operational amplifiers OP-AMPs 413 and passive elements 414 and 415. Although operational amplifiers OP-AMPs 413 are disposed under the stack corresponding to the detector in FIG. 4, the present invention is not limited thereto. In other words, as long as the operational amplifiers OP-AMPs are connected to the detector, they may be in any location/position. Examples of other packages in which the detector and the signal processor are coupled to each other in other configurations will be discussed below with reference to FIGS. 7 through 7C.

The detector (blocking chips 411 and photodiodes 412) and the signal processor (OP-AMP 413 and passive elements 414 and 415) are stacked on a substrate 416, and elements included in the detector and the signal processor are connected to one another through wirings 417. The substrate 416 may be, for example, a printed circuit board (PCB), an LTCC substrate, and/or an HTCC substrate.

In FIG. 4, molding surrounds the detector (blocking chips 411 and photodiodes 412) and the signal processor (OP-AMP 413 and passive elements 414 and 415) with molding material 418. As discussed above, the molding may be performed by heating and melting an EMC at a predetermined temperature (e.g., about 180° C.) and coating the components on substrate 416 with the EMC.

Pads 419 are coupled to the bottom of the substrate 416 and exposed to the outside of package 410. The pads 419 are used to input/output signals between the package 410 and any external devices or components. Pads 419 may have a variety of structures/configurations, including, but not limited to, a BGA, an LGA, and a QFN.

Package 410 includes a detector (blocking chips 411 and photodiodes 412) and a signal processor (OP-AMP 413 and passive elements 414 and 415), whose components are connected to each other through the wirings 417. By these means, package 410 can differentiate and detect any incident beta and/or gamma rays, and generate voltage pulses corresponding to any incident beta and/or gamma rays.

A method of manufacturing package 410 according to an embodiment of the present invention is illustrated in FIGS. 5A through 5G, which are cross-sectional views of package 410 at different stages of the manufacturing process.

Figure 5A:
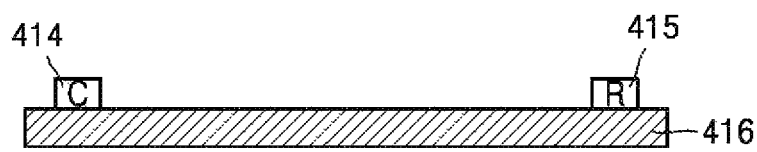
FIGS. 5A through 5G are cross-sectional views illustrating a method of manufacturing the package in FIG. 4 according to an embodiment of the present invention.

In FIG. 5A, the passive elements 414 and 415 are stacked on the substrate 416. The passive elements 414 and 415 may be attached to the substrate 416 by using, for example, surface-mount technology (SMT). The passive elements 414 and 415 may include a resistor (R) and/or a capacitor (C).

Figure 5B:
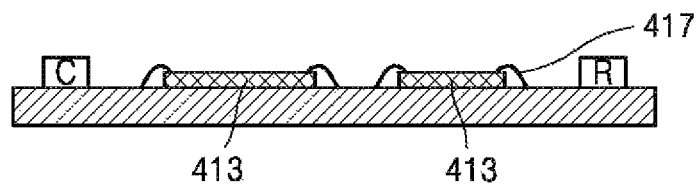

In FIG. 5B, the operational amplifiers OP-AMPs 413 are stacked on the substrate 416 and the wirings 417 are bonded to the substrate 416 and the operational amplifiers OP-AMPs 413. The wirings 417 may be formed of any suitable conductor, including, but not limited to, gold.

Figure 5C:
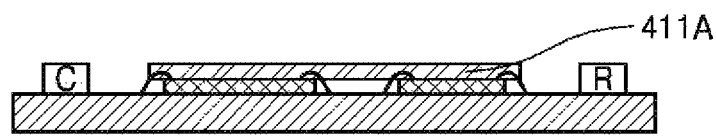

In FIG. 5C, the first beta-ray blocking chip 411A is stacked on the operational amplifiers OP-AMPs 413. In some embodiments, an attach film is attached to the beta-ray blocking chip and then stacked on the operational amplifiers.

Figure 5D:
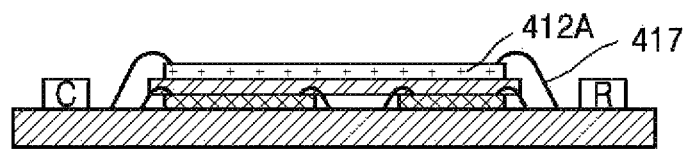

In FIG. 5D, the first photodiode 412A is stacked on the first beta-ray blocking chip 411A. In some embodiments, a photodiode to which an attach film is attached may be stacked on the blocking chip. The wirings 417 are bonded to the substrate 416 and the first photodiode 412A. The wirings 417 may be formed of, but are not limited to, gold.

Figure 5E:
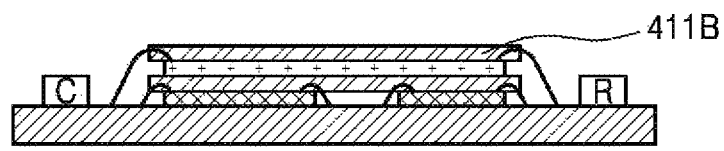

In FIG. 5E, the second beta-ray blocking chip 411B is stacked on the first photodiode 412A. As stated above, in some embodiments, attach film may be used when stacking the components.

Figure 5F:

In FIG. 5F, the second photodiode 412B is stacked on the second beta-ray blocking chip 411B and wirings 417 are bonded to the substrate 416 and the second photodiode 412B.

Figure 5G:
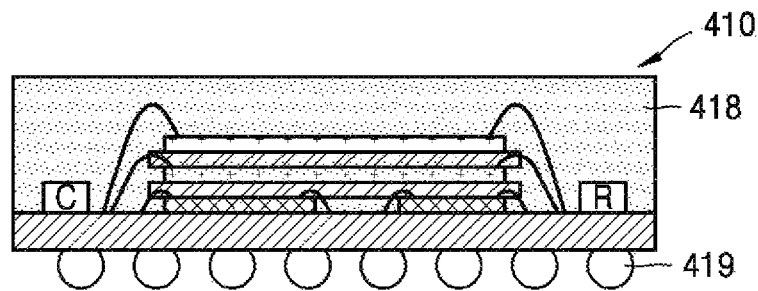

In FIG. 5G, molding is performed by using molding material 418 on the package 410. For example, transfer molding may be performed. Transfer molding refers to a method of heating a thermoplastic resin (e.g., a phenolic resin) and injecting the heated thermoplastic resin into a mold. Pads 419 are attached to the bottom of the substrate 416. Pads 419 are used to input/output signals to/from the package 410 and, for example, an external device. Pads 419 may have a variety of structures, including, but not limited to, a BGA, an LGA, and/or a QFN.

Figure 6:
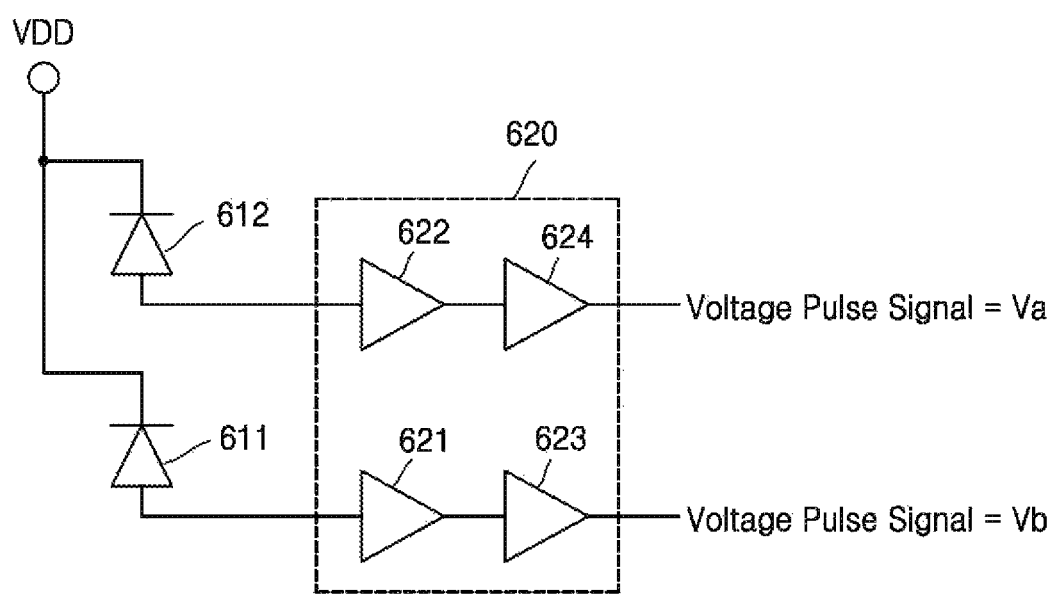
FIG. 6 is a simplified circuit diagram of a detector and signal processor according to an embodiment of the present invention.

FIG. 6 is a simplified circuit diagram of a detector and signal processor according to an embodiment. FIG. 6 is simplified for convenience of explanation in that only pertinent connections and components are shown. One of ordinary skill in the art would recognize other component and/or connections that may be optional and/or necessary for particular implementations.

In FIG. 6, a first photodiode 611 and a second photodiode 612 comprise the detector and operational amplifiers OP-AMPs 621, 622, 623, and 624 comprise signal processor 620.

Signal processor 620 in FIG. 6 comprises two stages of operational amplifiers OP-AMPs: a first stage comprising OP-AMPS 621 and 622 that convert photocurrents generated by the photodiodes 611 and 612, respectively, into voltage pulses, and a second stage comprising OP-AMPs 623 and 624 that receive the voltage pulses from the first stage and adjust the levels of the voltage pulses.

Thus, in the apparatus shown in FIG. 6, rays strike/pass through the surface of first photodiode 611, which outputs current corresponding to the incident rays, the current is turned into voltage pulses and adjusted by OP-AMPS 621 and 623, and finally outputted as voltage pulse signal Vb. Similarly, rays strike/pass through the surface of second photodiode 612, which outputs current corresponding to the incident rays, the current is turned into voltage pulses and adjusted by OP-AMPS 622 and 624, and finally outputted as voltage pulse signal Va. The voltage pulse signals may be measured using counts per minute (cpm).

Below, a particular situation is assumed in FIG. 6 for convenience of explanation, in which the first photodiode 611 receives, and generates a photocurrent corresponding to, gamma rays while the second photodiode 612 receives, and generates a photocurrent corresponding to, both beta rays and gamma rays.

Accordingly, as discussed above, the first photodiode 611 generates a photocurrent corresponding to the gamma rays, the photocurrent is converted into a voltage pulse and adjusted by signal processor 620, and then output as voltage pulse signal Vb, which in this case, corresponds to detected gamma rays alone.

Similarly, the second photodiode 612 generates a photocurrent corresponding to the beta and gamma rays, the photocurrent is converted into a voltage pulse and adjusted by signal processor 620, and then output as voltage pulse signal Va, which in this case, corresponds to detected beta and gamma rays.

According to embodiments of the present invention, the voltage pulse signals Va and Vb output by the signal processor 620 are used to detect and obtain a level/value for the amount/intensity of ambient beta rays and a level/value for the amount/intensity of ambient gamma rays.

For example, when the value of voltage pulse signal Va is 0, it means that no photocurrent was generated by the second photodiode 612. Since the second photodiode 612 generates a photocurrent corresponding to both the beta and gamma rays, it is determined that there are no detected beta rays or gamma rays. Alternatively, when the value of voltage pulse signal Vb is 0, it means that no photocurrent was generated by the first photodiode 611. Since the first photodiode 611 generates a photocurrent corresponding to the gamma rays only, it is determined that no gamma rays are detected.

Also when the value of voltage pulse signal Vb is 0, the level/amount of detected beta rays may be determined using the voltage pulse signal Va. For example, assuming that the voltage pulse signal Va is generated m times a minute (cpm), the level/amount of beta rays ($B_{value}$) may be calculated using Equation (1):

$$B_{value} = m * \text{factor}_{conversion} \tag{1}$$

In Equation (1), $B_{value}$ may be in units of μSv/h and $\text{factor}_{conversion}$ is a proportional coefficient between the level of the beta rays and the cpm value. $\text{factor}_{conversion}$ may be pre-stored in the radiation sensor.

When both voltage pulse signal Va and voltage pulse signal Vb have non-zero values, voltage pulse signal Va is compared to voltage pulse signal Vb.

When voltage pulse signal Va and voltage pulse signal Vb are the same (e.g., if the number of times the voltage pulse signal Va is generated for a predetermined period of time and the number of times the voltage pulse signal Vb is generated for the predetermined period of time are the same), it is determined that only gamma rays are detected. Since both photodiodes generate photocurrents corresponding to incident gamma rays, but second photodiode 612 (corresponding to voltage pulse signal Va) generates photocurrents corresponding to both gamma and beta rays, both photodiodes generating the same value means that only gamma rays are detected (i.e., no beta rays are detected).

When voltage pulse signal Va is greater than voltage pulse signal Vb, both beta rays and gamma rays are detected. Since the first photodiode 611 generates a photocurrent corresponding to gamma rays alone (Vb) and the second photodiode 612 generates a photocurrent corresponding to both the beta rays and the gamma rays (Va), when voltage pulse signal Va is greater than voltage pulse signal Vb, it means that both beta and gamma rays are detected. In this case, voltage pulse signal Vb corresponds to the level/amount of detected gamma rays and the difference between Va (beta and gamma rays) and Vb (gamma rays alone) corresponds to the level/amount of detected beta rays.

Returning to FIG. 6, it would be understood by one of ordinary skill in the art that although the embodiment shown in FIG. 6 has a particular configuration, in which first photodiode 611 and the second photodiode 612 are connected to the first stage operational amplifiers OP-AMPs 621 and 622, which are, in turn, connected to and separated from the second stage operational amplifiers OP-AMPs 623 and 624, the present invention is not limited thereto. In other words, one of ordinary skill in the art would recognize that other configurations are possible, including, but not limited to, a configuration in which the photodiodes are connected to a single stage of operational amplifiers.

Similarly, and as mentioned above, a package in which the detector and signal processor are coupled to each other is not limited to the structure of FIGS. 4 and 5. In order to provide some examples of this, other possible detector/signal processor packages are described below with reference to FIGS. 7A through 7D.

FIGS. 7A through 7D are cross-sectional views of packages in which the detector and signal processor are coupled to each other according to four other embodiments.

Only portions pertinent to the instant description are discussed and/or shown in reference to FIGS. 7A through 7D. Thus, for example, the passive elements used to drive the operational amplifiers are not illustrated, nor the wirings.

Also, the packages in FIGS. 7A through 7D are shown before molding is performed and the pads are attached.

Figure 7A:
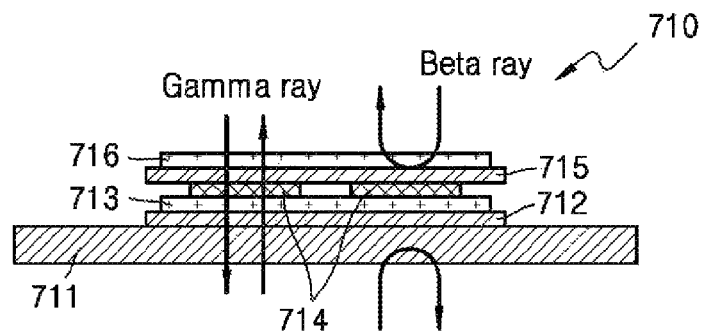
FIGS. 7A through 7D are cross-sectional views of packages, each of which has a different configuration of detector and signal processor according to other embodiments of the present invention.
Figure 7B:
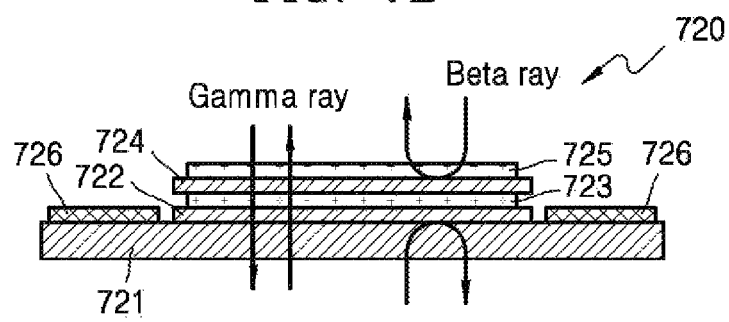
Figure 7C:
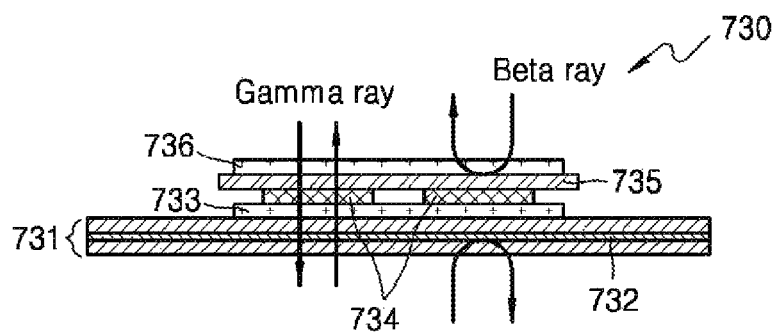
Figure 7D:
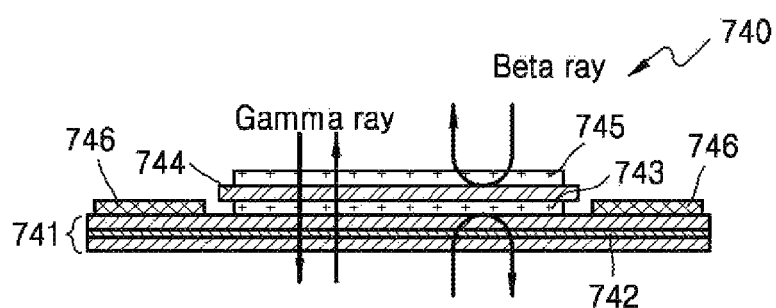

Generally speaking, the packages in FIGS. 7A and 7B have two blocking chip/layers while the packages in FIGS. 7C and 7D have one blocking chip/layer and a metal layer included in the substrate for blocking beta rays. Moreover, the operational amplifiers in the packages of FIGS. 7A and 7C are stacked as a layer within the stack of photodiodes and blocking chip/layers, while the operational amplifiers in the packages of FIGS. 7B and 7D are positioned outside of the stack of layers Package 710 in FIG. 7A may be generated by performing the following operations. First, the first beta-ray blocking chip 712 is stacked on the substrate 711 and a first photodiode 713 is stacked on the first beta-ray blocking chip 712. Next, operational amplifiers OP-AMPs 714 are stacked on the first photodiode 713 and the second beta-ray blocking chip 715 is stacked on the operational amplifiers OP-AMPs 714. Next, a second photodiode 716 is stacked on the second beta-ray blocking chip 715, thereby generating the package 710.

Package 720 in FIG. 7B may be generated by performing the following operations. First, the first beta-ray blocking chip 722 is stacked on the substrate 721 and a first photodiode 723 is stacked on the first beta-ray blocking chip 722. Next, the second beta-ray blocking chip 724 is stacked on the first photodiode 723. Next, a second photodiode 725 is stacked on the second beta-ray blocking chip 724. Operational amplifiers OP-AMPs 726 are attached directly to the substrate 721, next to first beta-ray blocking chip 722.

Package 730 in FIG. 7C may be generated by performing the following operations. First, a first photodiode 733 is stacked on the substrate 731 and operational amplifiers OP-AMPs 734 are stacked on the first photodiode 733. Next, a beta-ray blocking chip 735 is stacked on the operational amplifiers OP-AMPs 734. Next, a second photodiode 736 is stacked on the beta-ray blocking chip 735. As mentioned above, in this configuration, metal layer 732 in substrate 731 is acting as a second blocking layer.

Package 740 in FIG. 7D may be generated by performing the following operations. First, a first photodiode 743 is stacked on the substrate 741 and a beta-ray blocking chip 744 is stacked on the first photodiode 743. Next, a second photodiode 745 is stacked on the beta-ray blocking chip 744. Operational amplifiers OP-AMPs 746 are attached directly to the substrate 741, next to the first photodiode 743, and metal layer 742 in substrate 741 is acting as a second blocking layer.

In FIGS. 7A through 7D, the first photodiodes 713, 723, 733, and 743 have blocking layers on both sides and thus will generate photocurrents corresponding to gamma rays alone and the second photodiodes 716, 725, 736, and 745 have no blocking layer on one side and thus will generate photocurrents corresponding to both gamma rays and beta rays. Also, as discussed above, OP-AMPs 714, 726, 734, and 746 in FIGS. 7A through 7D convert the photocurrents into voltage pulses and may also adjust the voltage pulses to appropriate levels.

FIG. 8 is a flowchart of a method of differentially detecting beta rays and gamma rays according to an embodiment. FIG. 8 is conceptual and not intended to be interpreted literally. For example, the "steps" may be performed simultaneously and continuously by the components. As another example, the verbs do not necessarily indicate an action and/or deliberation. Thus, beta and gamma rays are "differentiated" by the mere existence of appropriately placed blocking layers, and the "determination" regarding the beta and gamma rays may be performed by "dumb" electronic components as well as by more sophisticated electronic components capable of executing instructions.

The operations indicated by the conceptual flowchart of FIG. 8 may be performed by any suitable device/apparatus according to embodiments of the present invention, including, but not limited to, any of the particular devices/apparatuses whose details are described herein.

In step 810, incident beta rays and gamma rays are differentiated by the blocking layers and currents are generated corresponding to the differentiated and/or undifferentiated rays. As a more detailed example with two photodiodes, the photodiode with blocking layers on both sides will receive any gamma rays and generate a current corresponding to any incident gamma rays while the photodiode with one unblocked side will receive any beta and/or gamma rays and generate a current corresponding to any incident beta and/or gamma rays.

In step 820, the currents are converted into voltage pulses corresponding to the incident rays. As a more detailed example, a signal processor may convert photocurrents generated by the photodiodes in the detector into voltage pulses, and then may further process the voltage pulses—for example, the voltage pulses may be amplified or reduced to levels high or low enough to be further processed by later components, such as a determiner.

In step 830, it is determined whether beta rays and/or gamma rays are detected based on the voltage pulses. As discussed above, the voltage pulses may correspond to the number of particle/ray strikes on a photodiode for a predetermined period of time, which information may be used to obtain the level/amount of detected beta rays and/or detected gamma rays.

This method, portions of this method, and any other methods/processes or portions of methods/processes according to embodiments of the present invention may be implemented as one or more programs stored on a non-transitory computer-readable medium and executable by one or more processors, including, but not limited to, controllers, microprocessors, and general-purpose digital computers. Data structures used in the methods/processes may also be recorded/temporarily stored by various components. Examples of non-transitory computer-readable media include, but are not limited to, magnetic storage media, e.g., read only memories (ROMs), random-access memories (RAMs), universal serial bus (USB) portable memories, floppy discs, and/or hard discs, and/or optically readable media, e.g., compact disk-read only memories (CD-ROMs) or digital versatile disks (DVDs).

Figure 9:
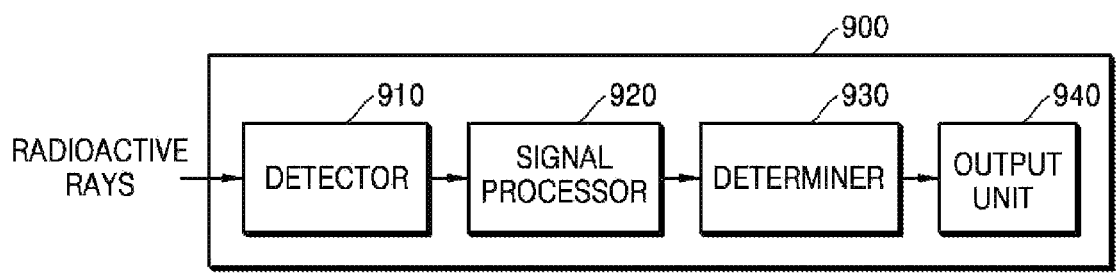
FIG. 9 is a block diagram of an apparatus for detecting radioactive rays according to another embodiment of the present invention.

FIG. 9 is a block diagram of an apparatus 900 for detecting radioactive rays according to another embodiment. Only elements of the apparatus related to the present embodiment are illustrated in FIG. 9. Accordingly, it will be understood by one of ordinary skill in the art that apparatus 900 may include other elements besides those illustrated in FIG. 9.

Apparatus 900 in FIG. 9 includes detector 910, signal processor 920, determiner 930, and output unit 940.

The functions and operations of detector 910, signal processor 920, and determiner 930 in apparatus 900 are substantially the same as the identically-named components described with reference to FIGS. 1 through 8. Accordingly, a detailed explanation of detector 910, signal processor 920, and determiner 930 will not be given.

The output unit 940 provides the user with information about any incident beta and/or gamma rays, such as whether beta rays or gamma rays are detected and the level/amount of detected beta rays and/or detected gamma rays. In some embodiments, the output unit 940 outputs a warning signal when the amount/level of beta or gamma rays exceeds a predetermined threshold/level. The predetermined threshold/level could be, for example, the level under which beta or gamma rays do not pose a risk or threat to human health.

The output unit 940 may indicate the type of radioactive rays that are detected or the amount/level of detected radioactive rays by, for example, displaying such information on a screen. If the level of detected radioactive rays exceeds a permissible level, the output unit 940 may output a warning signal, which may be, for example, an image and/or sound indicating that the level of detected radioactive rays exceeds a permissible level and/or an image and/or sound indicating that the user has to evacuate to a safer place.

The output unit 940 may output any type of signal discernible by a human, including, but not limited to, audio signals, video signals, and/or vibration/haptic signals. Accordingly, output unit 940 may include a screen/display or other type of visual output unit (e.g., one or more lights), a speaker or other type of sound output unit, and/or a vibration motor or other type of haptic output unit.

In some embodiments, the display which comprises at least a part of an output unit according to embodiments of the present invention may also be the general-purpose display of the apparatus. For example, the display may also be the user interface for controlling and performing operations with the apparatus. In one embodiment, the display is the user interface for selecting a virtual image, for setting an operation of the virtual image, and for buying an item of the virtual image.

In some embodiments, the display may be both an output and input device, such as when the display and a touchpad form a layer structure and constitute a touchscreen. The display may be, for example, a liquid crystal display (LCD), a thin-film transistor-LCD (TFT-LCD), an organic light-emitting diode (OLED), a flexible display, a three-dimensional (3D) display, and/or an electrophoretic display.

In embodiments where the output unit comprises a sound output unit, it may be, for example, a speaker and/or a buzzer.

Although the output unit 940 is included in the apparatus 900 in FIG. 9, the present invention is not limited thereto. For example, the output unit may be a separate and/or independent module or device. In such a case (i.e., when the output unit is separate/independent), the apparatus may send appropriate/suitable signals to the output unit, such as requesting the output unit of a mobile device connected to or containing the apparatus to output a warning signal. A similar operation would be performed if the apparatus was contained within and/or connected to, for example, a desktop PC, a notebook PC, a laptop PC, a tablet PC, a smart phone, and/or a wearable device.

Figure 10B:
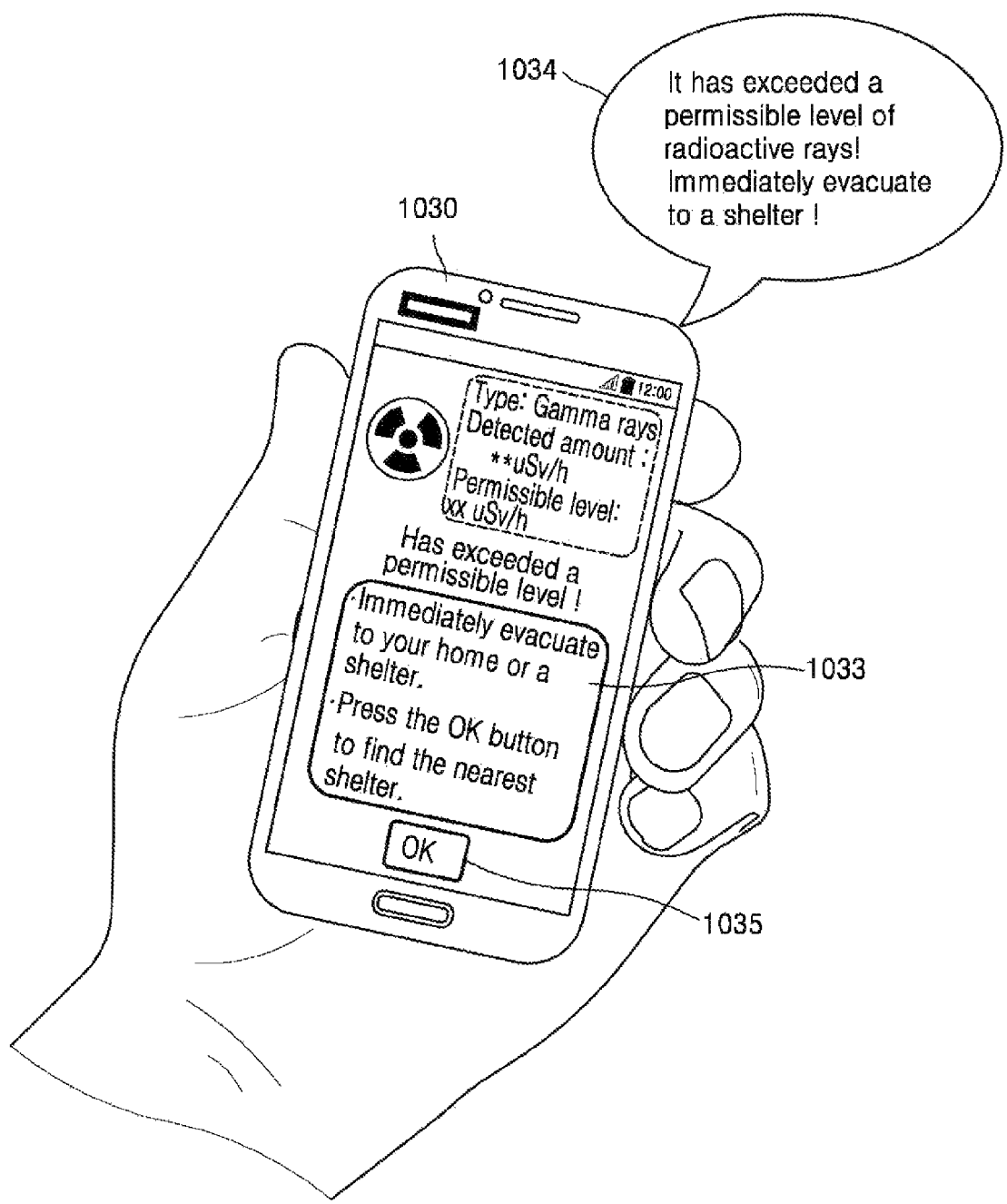
Figure 10C:
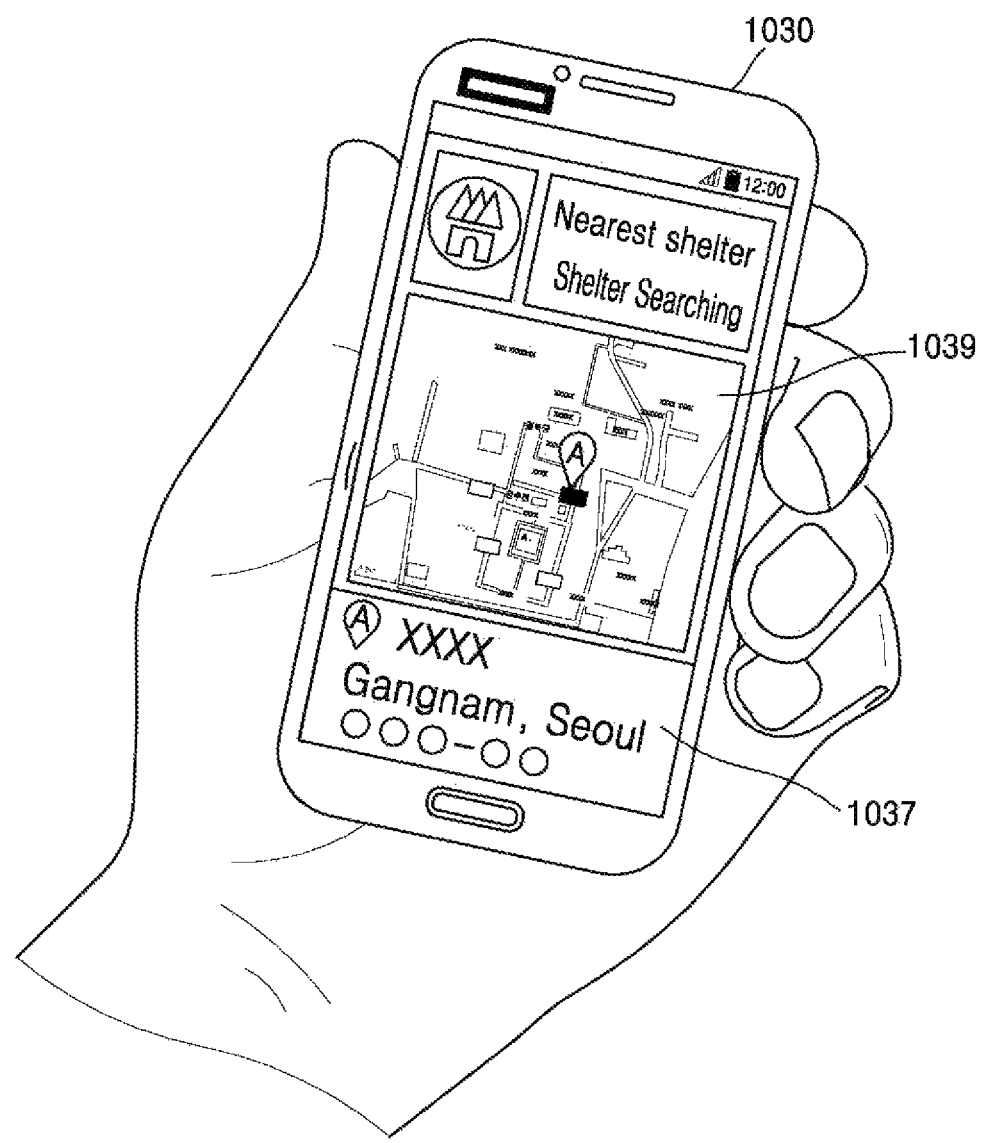

FIGS. 10A through 10C show examples of information, such as warning signals, output from an output unit according to embodiments of the present invention.

In FIG. 10A, a wearable device in the form of a watch 1010 includes a radiation sensor in accordance with an embodiment of the present invention. Although watch 1010 is illustrated as the wearable device in FIG. 10A, wearable devices according to the present invention are not limited thereto. A wearable device according to embodiments of the present invention can be any device that is worn and/or otherwise attached to a body of a user and can perform the operations as described herein. Such a wearable device may also transmit/receive data to/from networks and/or external devices. Examples of wearable devices include, for example, watches, glasses, bracelets, rings, necklaces, shoes, or adhesive pads or stickers.

In FIG. 10A, watch 1010 displays the type 1011 of detected radioactive rays and the amount 1012 of detected radioactive rays on a screen. In this embodiment, when the level of the radioactive rays exceeds a permissible level, a visual indicator 1013 and an audio message 1014 indicating that the level of the radioactive rays exceeds the permissible level is also output.

In FIG. 10B, smart phone 1030 includes a radiation sensor in accordance with an embodiment of the present invention. If the amount of detected radioactive rays exceeds the permissible level, an output unit may output information concerning countermeasures to the user. In this example, smart phone 1030 displays a visual indicator 1033 indicating that countermeasures must be taken on its screen and also generates a sound, i.e., audio message 1034, indicating that countermeasures must be taken.

Smart phone 1030 in FIG. 10B also displays an OK button 1035 below the text message "Press the OK button to find the nearest shelter" in visual indicator 1033. When the OK button 1035 is selected, information about a place (e.g., a shelter) where the user may not be exposed to radiation is presented to the user as shown, for example, in FIG. 10C.

In FIG. 10C, the user has selected the OK button 1033 in FIG. 10B and smart phone 1030 is searching for and showing nearby shelters on the screen. More specifically, smart phone 1030 displays an address 1037 of a nearby shelter and the location of the shelter on a map 1039.

Figure 11:
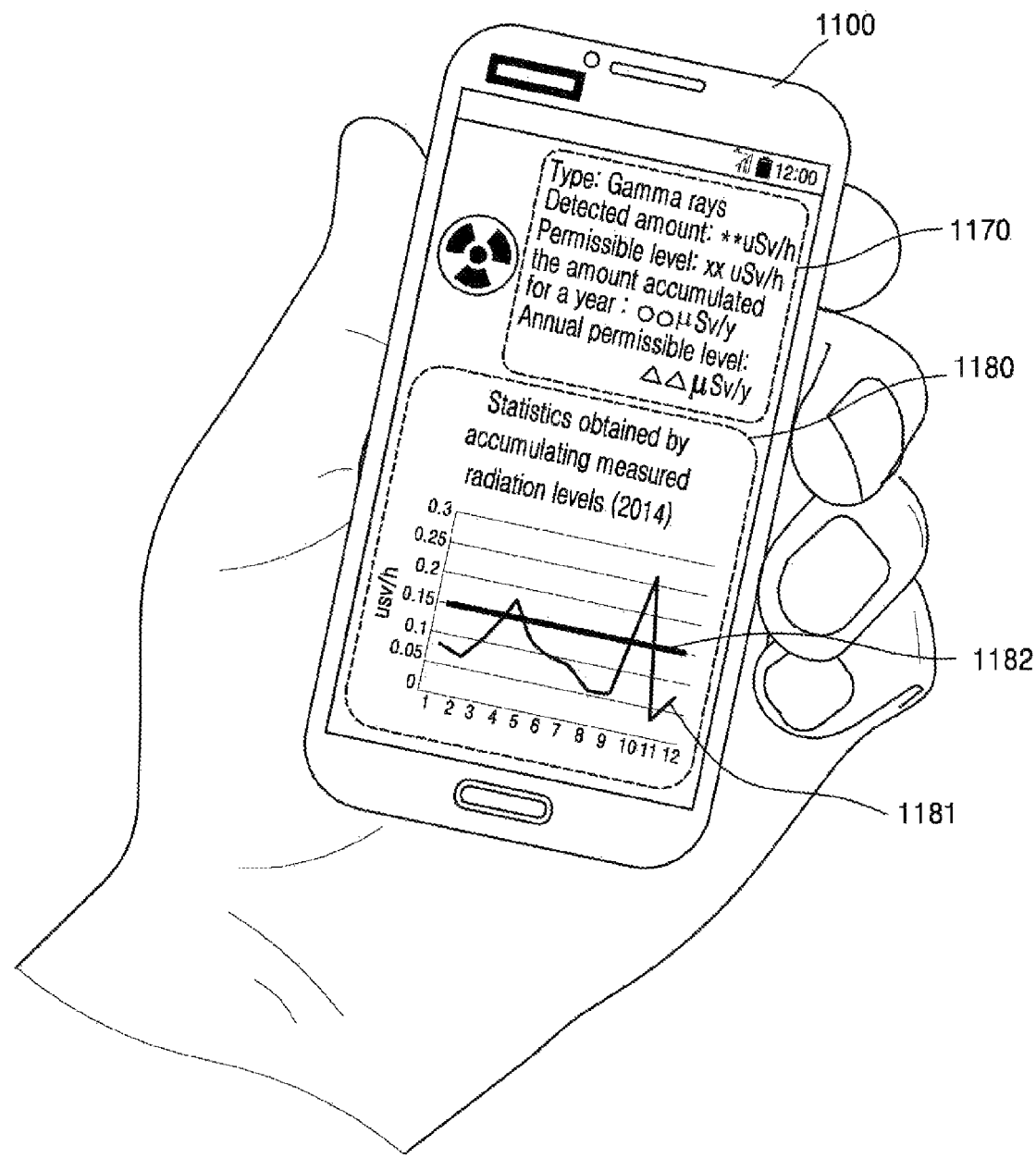
FIG. 11 shows another example of output information, i.e., a graph regarding accumulating levels of measured radioactive rays, according to an embodiment of the present invention.

FIG. 11 shows another example of information that may be output according to an embodiment of the present invention, such as statistics and/or other analyses of accumulated data. Specifically, FIG. 11 provides an example of a graph for the visual display of statistics regarding accumulating levels of measured radioactive rays.

Smart phone 1100 has stored the amount/level of radioactive rays detected by its radiation sensor over a period of time and has the capacity to calculate/analyze using the stored data.

In FIG. 11, smart phone 1100 outputs summary information 1170, including the type and amount/level of currently detected radioactive rays, the permissible level/amount of radioactive rays, the amount/level of accumulated radiation exposure for the year, and the permissible amount/level of radiation exposure per year. Embodiments of the present invention may show the types and levels/amounts of detected radioactive rays for any period of time, e.g., one month or one year, and/or may show the number of times radioactive rays are detected.

In FIG. 11, smart phone 1100 also outputs a visual indication 1180 of information obtained by processing/analyzing the stored accumulated data. More specifically, the level of detected radioactive rays over time is indicated by a line 1181 on a graph in which the permissible level is also indicated by a line 1182.

Figure 12:
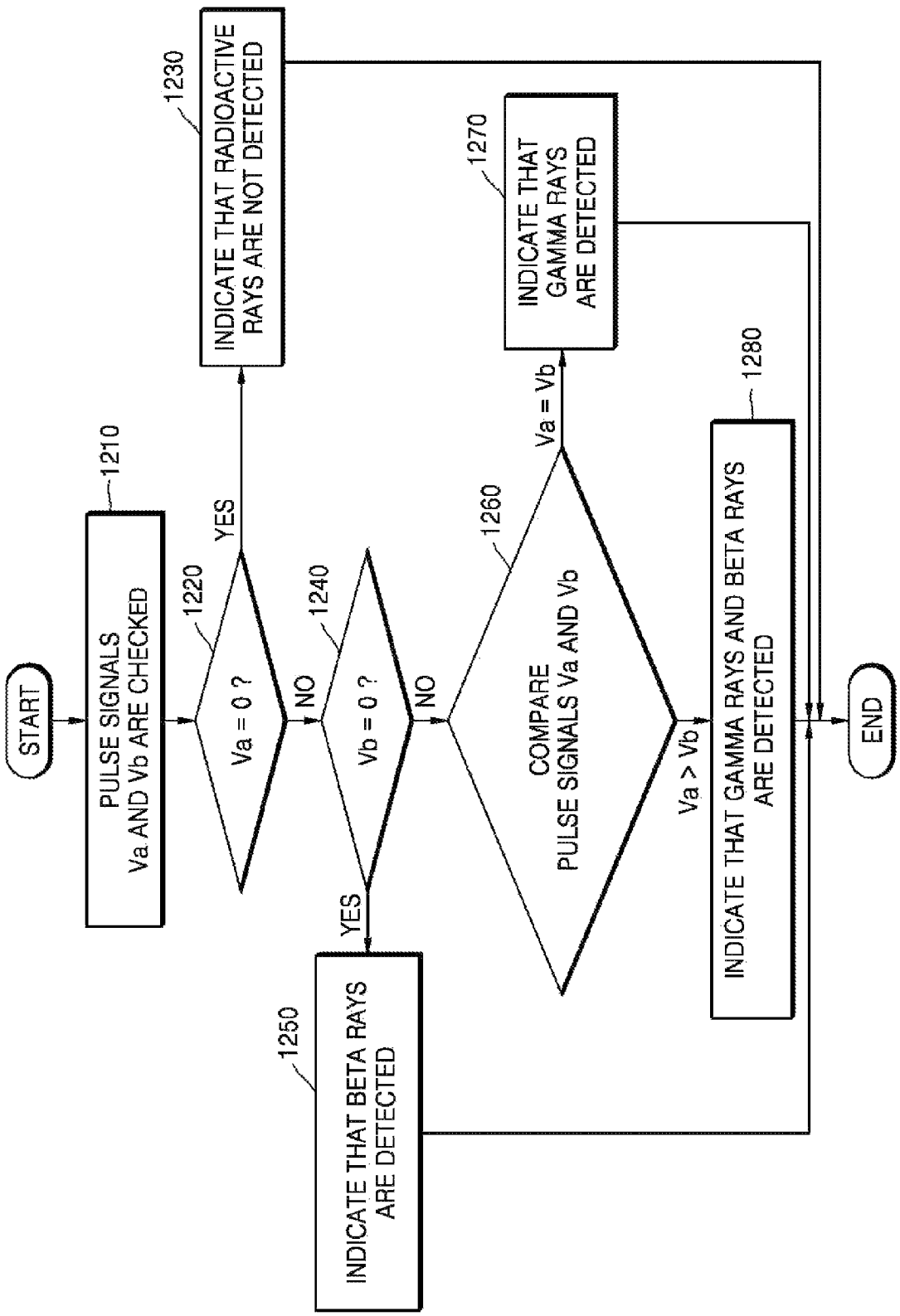
FIG. 12 is a flowchart of a method of indicating the results of differentially detecting beta and gamma rays according to an embodiment of the present invention.

FIG. 12 is a flowchart of a method of indicating to the user the results of differentially detecting beta and gamma rays according to an embodiment. In FIG. 12, only pertinent operations will be explained for convenience. The operations referred to in FIG. 12 may be performed by any suitable radiation sensor or apparatus including or connected with a radiation sensor according to embodiments of the present invention, including, but not limited to, any of the particular devices/apparatuses whose details are described herein.

In FIG. 12, it is assumed that voltage pulse signal Vb corresponds to any detected gamma rays and voltage pulse signal Va corresponds to any detected beta and/or gamma rays.

In step 1210, voltage pulse signal Va and voltage pulse signal Vb are checked/determined/read.

In step 1220, it is determined whether the value of voltage pulse signal Va is 0. When the value of voltage pulse signal Va is 0, the method proceeds to step 1230; otherwise, the method proceeds to step 1240.

If voltage pulse signal Va is 0, an indication that radioactive rays are not detected is output in step 1230. This may be done, for example, by displaying the indication on a screen and/or outputting the indication as a sound indicating that radioactive rays are not detected.

If voltage pulse signal Va is not 0, it is determined whether the value of voltage pulse signal Vb is 0 in step 1240. When the value of voltage pulse signal Vb is 0, the method proceeds to step 1250; otherwise, the method proceeds to step 1260.

If voltage pulse signal Vb is 0, an indication that beta rays are detected is output in step 1250. This may be done, for example, by displaying the indication on a screen and/or outputting the indication as a sound indicating that beta rays are detected. In some embodiments, if the level/amount of detected beta rays exceeds a permissible threshold/level, a warning signal is output. The warning signal may be a visual or audio indication that the level of detected beta rays exceeds the permissible level. In addition, countermeasures, such as evacuation instructions and shelter locations, may be output to the user. In embodiments where radiation data is stored and accumulated, a warning signal and/or other information may be output when the accumulated level/amount of detected beta rays exceeds a permissible level of accumulation.

If voltage pulse signal Vb is not 0, voltage pulse signal Va is compared with voltage pulse signal Vb in step 1260. This may be done by, for example, comparing the number of times voltage pulse signal Va is generated for a predetermined period of time with the number of times voltage pulse signal Vb is generated for the predetermined period of time. If Va and Vb are the same, the method proceeds to step 1270. If Vb is greater than Va, the method proceeds to step 1280.

If Va=Vb, an indication that gamma rays are detected is output in step 1270 by, for example, visual and/or audio means. In some embodiments, if the level/amount of detected gamma rays exceeds a permissible threshold/level, a warning signal is output. The warning signal may be a visual or audio indication that the level of detected gamma rays exceeds the permissible level. In addition, countermeasures, such as evacuation instructions and/or shelter locations, may be output to the user. In embodiments where radiation data is stored and accumulated, a warning signal and/or other information may be output when the accumulated level/amount of detected gamma rays exceeds a permissible level of accumulation.

If Va>Vb, an indication that both beta rays and gamma rays are detected is output in step 1280 by, for example, visual and/or audio means. In some embodiments, if the level of detected beta and/or gamma rays exceeds a permissible threshold/level, a warning signal is output. The warning signal may be a visual or audio indication that the level of detected beta and/or gamma rays exceeds the permissible level. In addition, countermeasures, such as evacuation instructions and/or shelter locations, may be output to the user. In embodiments where radiation data is stored and accumulated, a warning signal and/or other information may be output when the accumulated level/amount of detected beta and/or gamma rays exceeds a permissible level of accumulation.

This method, portions of this method, and any other methods/processes or portions of methods/processes according to embodiments of the present invention may be implemented as one or more programs stored on a non-transitory computer-readable medium and executable by one or more processors, including, but not limited to, controllers, microprocessors, and general-purpose digital computers. Data structures used in the methods/processes may also be recorded/temporarily stored by various components. Examples of non-transitory computer-readable media include, but are not limited to, magnetic storage media, e.g., read only memories (ROMs), random-access memories (RAMs), universal serial bus (USB) portable memories, floppy discs, and/or hard discs, and/or optically readable media, e.g., compact disk-read only memories (CD-ROMs) or digital versatile disks (DVDs).

In FIGS. 1 through 12, the radiation sensor only senses beta and gamma rays. However, other sensors such as an ultraviolet sensor may be included in a personal electronic device, such as a mobile terminal. In such devices, the plurality of sensors may constitute a single package according to embodiments of the present invention, such that the area occupied by the plurality of sensors in the electronic device may be reduced.

Examples where a plurality of sensors constitutes a single package are discussed below with reference to FIGS. 13 through 19. At points in the description herein, a single package which includes a plurality of sensors may be referred to as an environment sensor or an environment sensor package.

Figure 13:
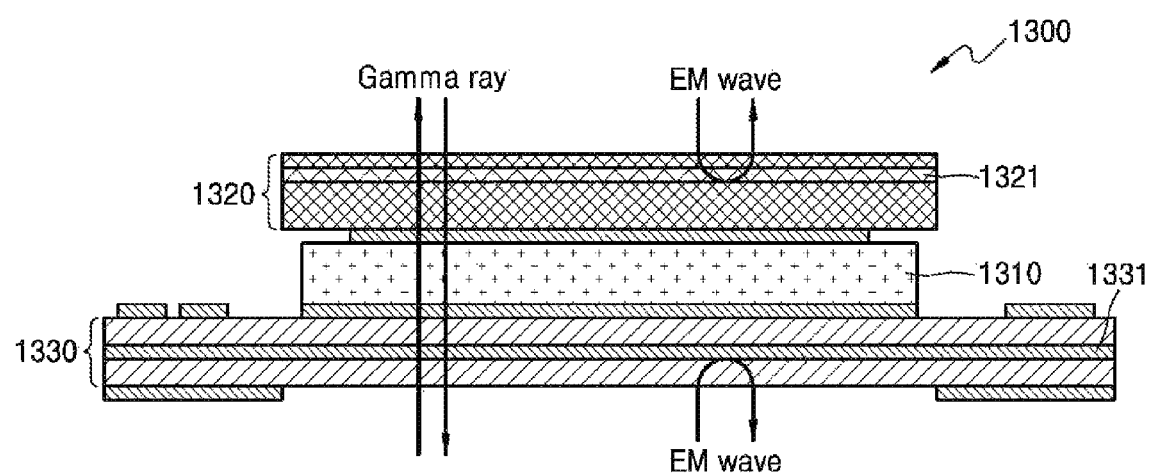
FIG. 13 is a cross-sectional view of an environment sensor package according to an embodiment of the present invention.

FIG. 13 is a cross-sectional view of an environment sensor package 1300 according to an embodiment.

Environment sensor package 1300 in FIG. 13 includes radiation sensor 1310, interposer 1320, and substrate 1330. The operation and method of manufacturing radiation sensor 1310 may be substantially the same as those described with reference to FIGS. 1 through 12.

In FIG. 13, the radiation sensor 1310 is stacked on the substrate 1330 and the interposer 1320 is stacked on the radiation sensor 1310. The substrate 1330 may be, for example, a PCB, an LTCC substrate, and/or an HTCC substrate. In the embodiment shown in FIG. 12, substrate 1330 includes metal layer 1331. The metal layer 1331 blocks undesired EM waves that are incident to the environment sensor package 1300. When such undesired EM waves reach, for example, the radiation sensor 1310, the electronic device may operate abnormally or not at all. Accordingly, undesired EM waves from one side of package 1300 are prevented from reaching the radiation sensor 1310 by metal layer 1331 in substrate 1330. On the other side of package 1300, interposer 1320 includes metal layer 1321 to prevent undesired EM waves from reaching radiation sensor 1310 from the other side.

Interposer 1320 may be formed by stacking a metal layer that blocks EM waves on a metal layer such as a wafer or a copper layer of a PCB, and then stacking a layer for die or wire bonding and/or forming re-wiring on the stacked blocking metal layer.

Figure 14:
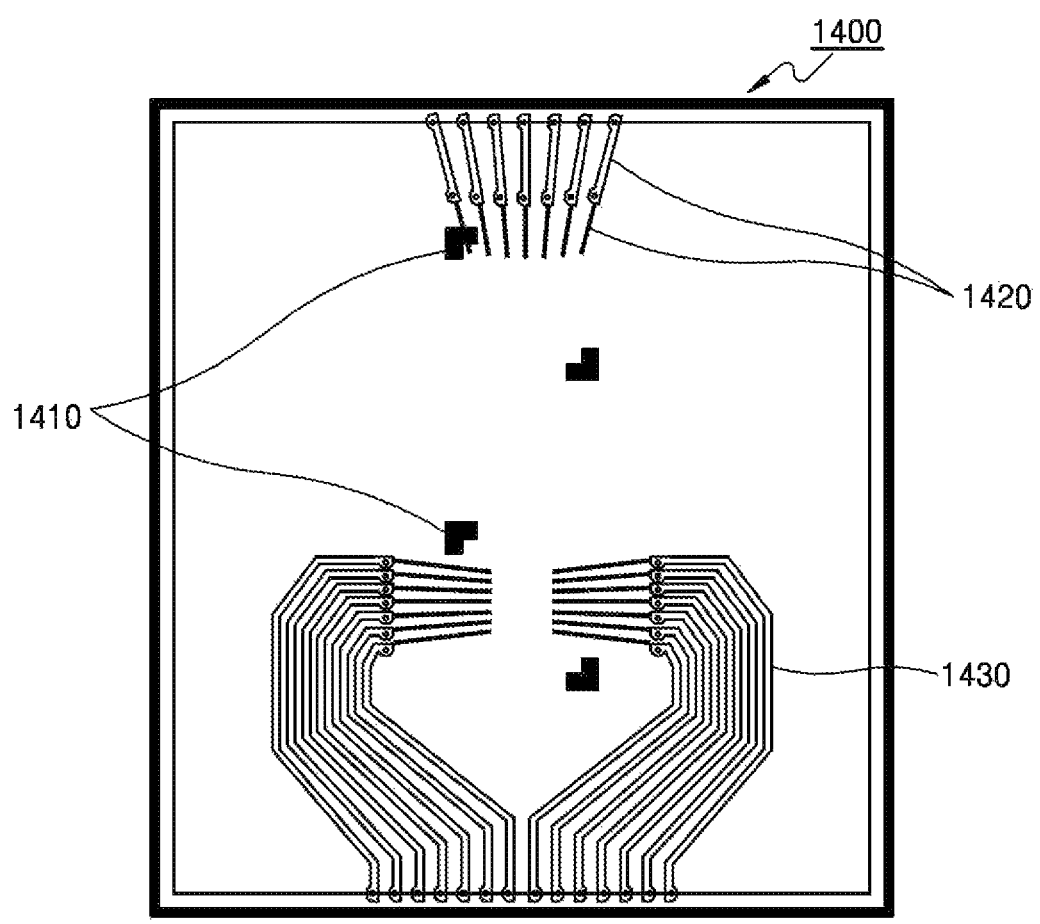
FIG. 14 is a planar view of the surface of an interposer according to an embodiment of the present invention.

Interposer 1320 may include one or more pads and re-wiring patterns for die bonding or wire bonding on the surface of its top layer, such as is shown in FIG. 14 discussed below. Die bonding is a process of mounting components, such as a sensor or a chip, on a surface, such as the outer surface of interposer 1320. In general, die bonding fixes and electrically connects the components to the surface, often by thermocompression or ultrasonic bonding. Wire bonding connects a component, such as a sensor or chip, which is stacked on the interposer 1320 to the interposer 1320 by forming one or more lines of a suitable conductor, such as gold (Au), aluminum (Al), or copper (Cu).

Interposer layers according to embodiments of the present invention are described below with reference to FIGS. 14 through 15B.

FIG. 14 is a plan view of the surface 1400 of the uppermost layer in an interposer according to an embodiment. Surface 1400 has markers 1410 for die bonding, pads 1420 for wire bonding, and re-wiring 1430. Accordingly, components, such as sensors or chips, may be stacked on the interposer so that the environment sensor package may have a multi-sensor multi-chip stack structure.

Figure 15A:
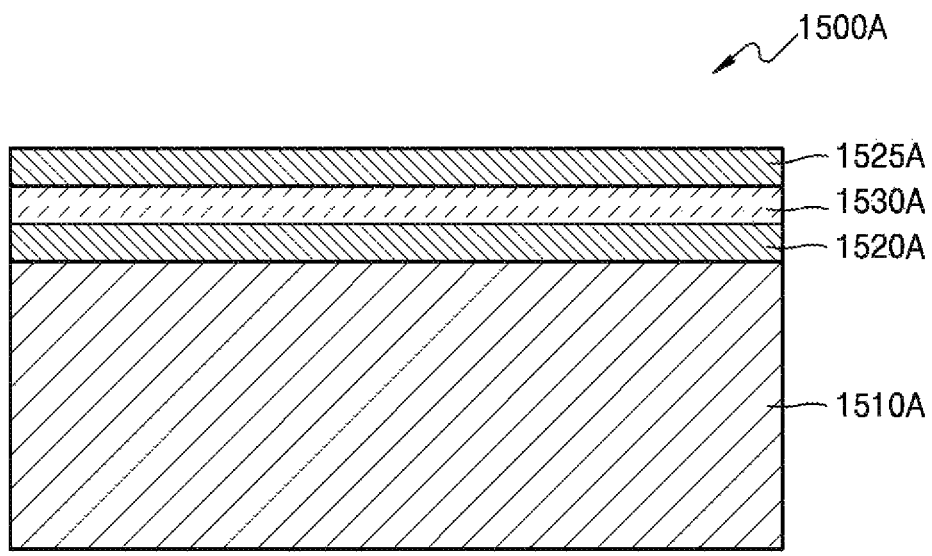
FIGS. 15A and 15B are cross-sectional views of interposer structures according to embodiments of the present invention.
Figure 15B:
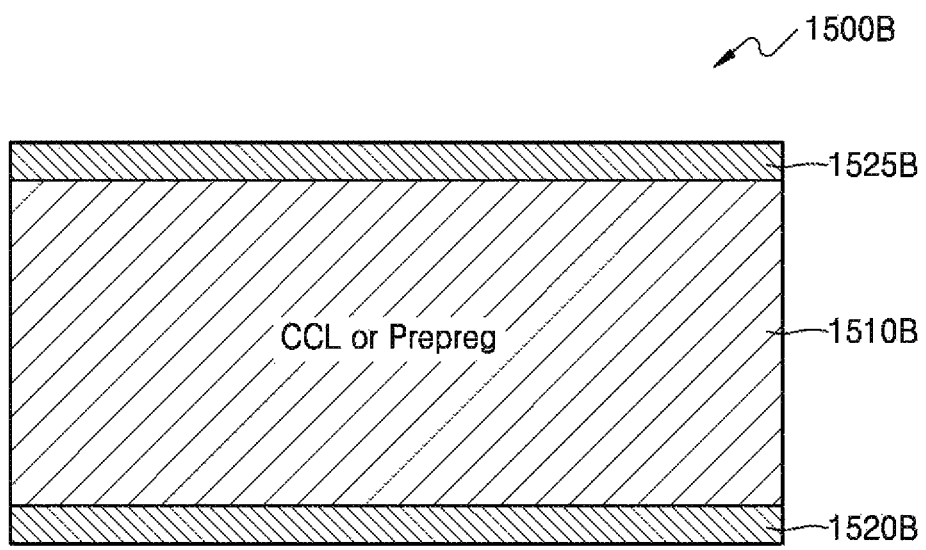

FIGS. 15A and 15B are cross-sectional views of two structures for an interposer according to embodiments of the present invention.

Interposer 1500A in FIG. 15A is formed by stacking a first metal layer 1520A on a silicon wafer 1510A and then stacking a passivation layer 1530A on the first metal layer 1520A. A second metal layer 1525A is further stacked on the passivation layer 1530 (this may not be necessary in other embodiments). The first and second metal layers 1520A and 1525A block undesired EM waves.

Interposer 1500B in FIG. 15B is formed by stacking copper layer 1525B over and copper layer 1520B under a layer 1510A of copper-clad laminate (CCL) or prepreg. CCL is a thin laminate clad with copper. Examples of CCL include glass epoxy CCL formed of a CCL and a reinforced material formed by penetrating an epoxy resin into a glass fiber, paper phenol CCL mainly used to manufacture single side PCBs, composite CCL formed by combining two or more reinforced materials, high-frequency CCL formed of material suitable to high-speed signal transmission, and CCL for flexible PCBs (FPCBs). Prepreg is an intermediate material for molding, such as a fiber-reinforced composite material where a reinforced fiber is impregnated with a matrix resin. In general, a molded product may be formed by stacking a prepreg and curing the resin through heating and compression.

Figure 16:
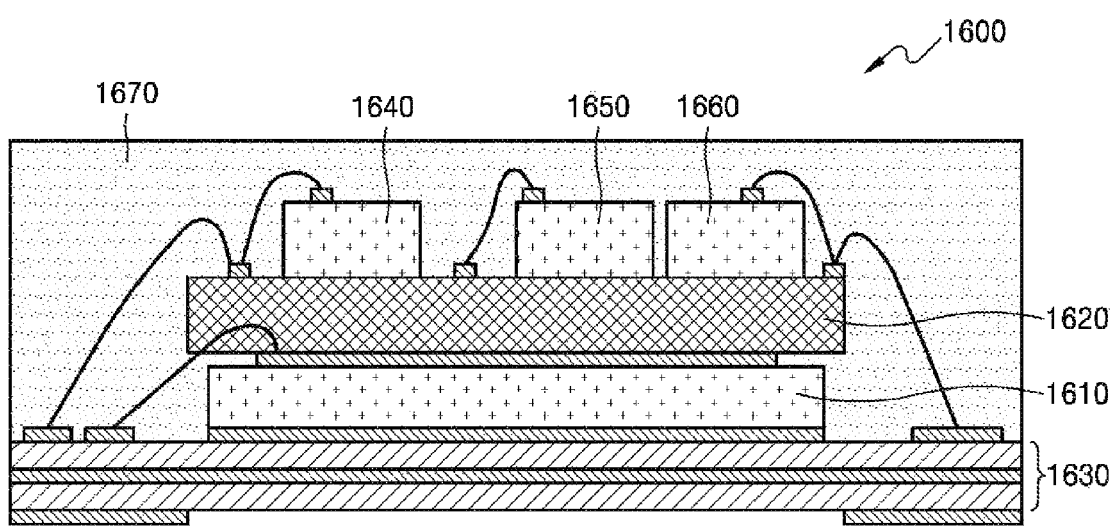
FIG. 16 is a cross-sectional view of an environment sensor package including molding according to an embodiment of the present invention.

FIG. 16 is a cross-sectional view of environment sensor package 1600 including its molding according to an embodiment of the present invention.

Environment sensor package 1600 is different from environment sensor package 1300 of FIG. 13 in that environment sensor package 1600 (1) is molded using molding material 1670, and (2) has an ultraviolet sensor 1640, signal processing chip 1650, and an EM wave sensor 1660 stacked on its interposer 1620.

Substrate 1630, radiation sensor 1610, and interposer 1620 in environment sensor package 1600 function in substantially the same fashion as the identically-named components described with reference to FIGS. 13 through 15B, and thus a detailed explanation thereof will not be given.

Ultraviolet sensor 1640 detects ultraviolet rays incident on the environment sensor package 1600, which may itself be in a device. EM wave sensor 1660 detects RF or EM waves incident on the environment sensor package 1600. Although ultraviolet sensor 1640 and EM wave sensor 1660 are stacked on interposer 1620 in FIG. 16, the present invention is not limited thereto. For example, other sensors may also be included in an environment sensor package according to embodiments of the present invention.

Signal processing chip 1650 converts signals detected by sensors in the environment sensor package 1600 into pulse signals capable of being processed, e.g., having levels high or low enough to be processed. For example, signal processing chip 1650 receives signals from ultraviolet sensor 1640 when it detects ultraviolet rays and signals from EM wave sensor 1660 when it detects EM waves, and converts them into pulse signals having levels within a predetermined range. In different embodiments, the signal processor may be included in other components, e.g., the radiation sensor may include the signal processor. In this embodiment, signal processing chip 1650 functions as the signal processor for all of the sensors.

Environment sensor package 1600 is externally molded with molding material 1670. The external molding protects the elements and wirings in environment sensor package 1600 from damage such as from an external impact or to penetration by moisture. Examples of molding manufacturing include transfer molding, compression molding and filling using a dispenser.

When an ultraviolet sensor is included in the environment sensor package, as is the case with package 1600, at least some of the molding material may be transparent to ultraviolet rays. In this respect, the molding material may be a material through which only ultraviolet rays included in the incident visual/near-visual light spectrum may pass.

In some embodiments, the molding material may be a material whose color and/or transparency/opaqueness changes based on the amount of incident ultraviolet rays and thus can be considered a part of the detector. In such an embodiment, the ultraviolet sensor may be implemented by using a light-emitting diode (LED) and a photodiode on opposite sides of the molding. In other words, when ultraviolet rays are incident on the molding, its degree of transparency varies according to the amount of the ultraviolet rays. Accordingly, the amount of light received by the photodiode through the molding from the LED on the other side of the molding varies according to the amount of ultraviolet rays incident on the molding, and thus a current generated by the photodiode varies according to the amount of incident ultraviolet rays as well. In this manner, the amount of the ultraviolet rays may be detected without actually having an ultraviolet sensor.

Although not shown in FIG. 16, one or more pads will be attached to the bottom of substrate 1630 to input/output signals to/from environment sensor package 1600 and any external entities, such as other device components, other devices, system busses, and/or networks. The pads may have any structure suitable to the particular implementation, including, but not limited to, a BGA, an LGA, and/or a QFN.

Environment sensor package 1600 of FIG. 16 is only one example; another example of a stacked structure according to the present invention is described below with reference to FIG. 17.

Figure 17:
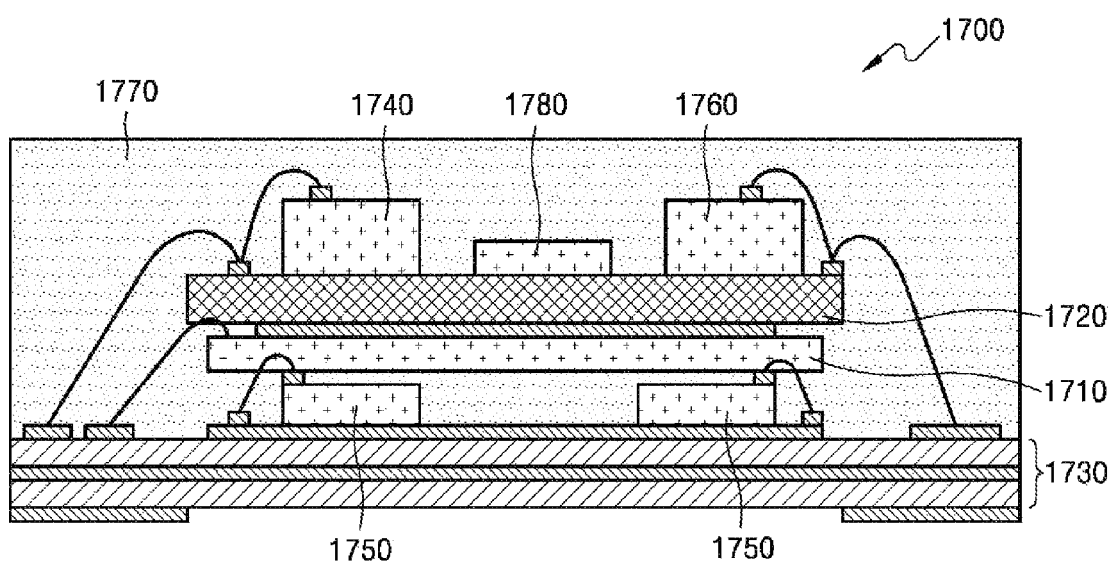
FIG. 17 is a cross-sectional view of an environment sensor package including molding according to another embodiment of the present invention.

FIG. 17 is a cross-sectional view of environment sensor package 1700 including molding according to another embodiment.

Environment sensor package 1700 is different from environment sensor package 1600 in that (1) signal processing chip(s) 1750 is stacked directly on substrate 1730 and is thus below, and supporting, radiation sensor 1710, above which interposer 1720 is stacked; and (2) antenna pattern 1780 is, with ultraviolet sensor 1740 and EM wave sensor 1760, stacked on interposer 1720.

Antenna pattern 1780 may receive an RF signal or other types of EM waves. Accordingly, environment sensor package 1700 may receive a signal having a specific wavelength that is generated in a harmful material or EM waves. Accordingly, signal processing chip 1750 is disposed beneath interposer 1720, between substrate 1730 and radiation sensor 1710. Like package 1600, a metal layer in substrate 1630 blocks EM waves from radiation sensor 1710.

Figure 18:
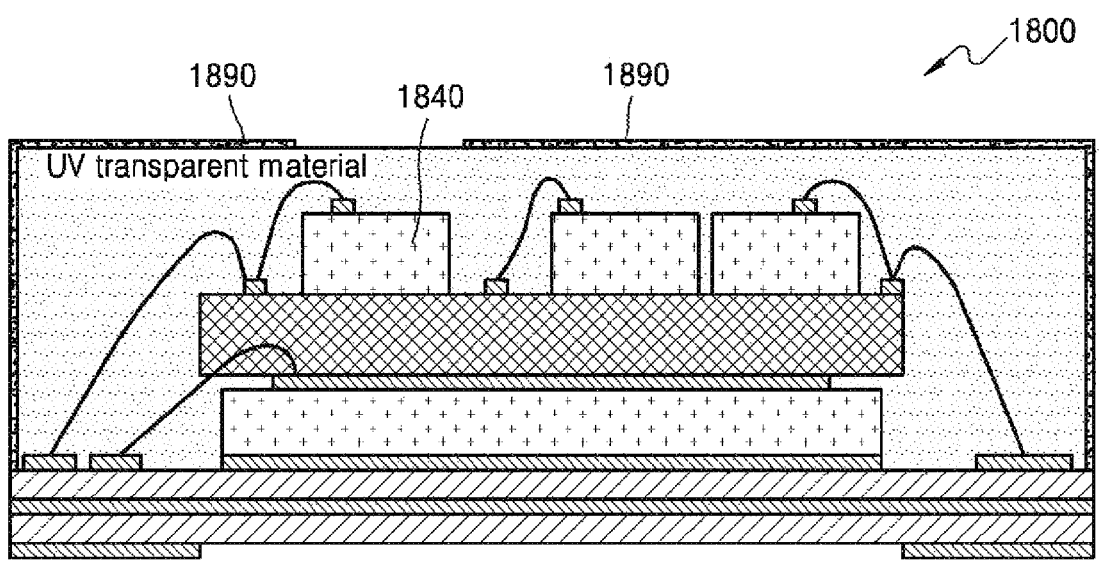
FIG. 18 is a cross-sectional view of an environment sensor package including molding according to yet another embodiment of the present invention.

FIG. 18 is a cross-sectional view of environment sensor package 1800 including molding according to another embodiment.

The stack of layers in environment sensor package 1800 is substantially the same as the stack in environment sensor package 1600; however, coating agent 1890 which blocks EM waves is applied to the side surfaces and top surface of environment sensor package 1800. Since EM shielding material typically requires a metal filler, a coating for preventing oxidation may be layered on top of coating agent 1890.

Because ultraviolet sensor 1840 is included in environment sensor package 1800, coating agent 1890 is not applied to the to the surface above sensor 1640 in order to allow ultraviolet rays to reach ultraviolet sensor 1640 (or, in an embodiment with molding whose transparency varies with any incident ultraviolet rays, to allow light to reach the light sensor).

FIGS. 19A and 19B are views of a wearable device, watch 1900, including an environment sensor package according to an embodiment. FIG. 19A shows watch 1900 on the user's wrist, while FIG. 19B is a cross-sectional view of a portion of the watch strap which includes the environment sensor package. Although watch 1900 is illustrated as the wearable device in FIG. 19A, the present invention is not limited thereto. For example, a wearable device including a radiation sensor in accordance with the present invention may be any of various devices capable of being worn and/or attached to a body of a user, for example, a watch, glasses, a bracelet, a ring, a necklace, a shoe, or a sticker/adhesive flexible patch or pad. The radiation sensor in the environment sensor package in FIGS. 19A and 19B is formed in accordance with the present invention and may take the form of, for example, any of the particular packages whose details are described herein.

An environment sensor package according to the present invention may be mounted on a portion of a wearable device that is exposed to the outside. In FIG. 19A, where the wearable device is watch 1900, the environment sensor package 1930 is mounted within strap 1950 of watch 1900. Since strap 1950 must be bendable, the substrate of environment sensor package 1930 is a flexible printed circuit board (FPCB) 1940.

As shown in the cross-section of FIG. 19B, environment sensor package 1930 is mounted in strap 1950 of watch 1900. FPCB 1940 is inserted into strap 1950 and environment sensor package 1930 is stacked on FPCB 1940. Since environment sensor package 1930 includes an ultraviolet sensor, a lens 1960 for the transmission and collection of ultraviolet rays is formed on the surface of strap 1950 in order for external ultraviolet rays to be incident thereon.

FIGS. 20A and 20B are views of a mobile device, smart phone 2000, which includes an environment sensor package according to an embodiment. FIG. 20A shows smart phone 2000 being held by the user, while FIG. 20B is a cross-sectional view of environment sensor package 2020 mounted on smart phone 2000. Although smart phone 2000 is illustrated as the mobile device in FIG. 20A, the present invention is not limited thereto For example, a mobile device which includes a radiation sensor in accordance with the present invention may be a notebook PC, a laptop PC, or a tablet computer. Although environment sensor package 2020 has a structure similar to package 1800 in FIG. 18, any package structure in accordance with the present invention may be used, such as, for example, any of the other packages whose details are described herein.

Environment sensor package 2020 is mounted on a portion of smart phone 2000 that is externally exposed. Although environment sensor package 2020 is mounted on an upper portion of the smart phone 2000 in FIG. 20A, the present invention is not limited thereto: any suitable location on smart phone 2000 may be used.

FIG. 20B is a cross-section of the environment sensor package 2020 mounted on smart phone 2000. Because an ultraviolet sensor is included in the environment sensor package 2020, a lens 2030 for transmitting and collecting ultraviolet rays is formed on the surface of the environment sensor package 2020 in order for external ultraviolet rays to be incident thereon.

As described above, an apparatus for detecting radioactive rays (or a radiation sensor) has a structure in which one or more photodiodes and one or more blocking chips are alternately stacked so that incident radiation may be differentially detected. Since the apparatus or radiation sensor may be manufactured as a small package, the apparatus or radiation sensor takes up less room than conventional radiation sensors and may be more easily mounted on a small device (e.g., a smart phone or a wearable device), and manufacturing costs may also be reduced. Also, since information concerning detected radioactive rays is provided to a user, such as warning signals and countermeasures when the level of the radioactive rays exceeds a permissible level, user safety and health may be improved. User convenience may also be improved by storing, tracking, and providing radiation exposure data to the user.

Also, since a plurality of sensors including the radiation sensor may be included in a single package, the area occupied by the plurality of sensors in a device may be reduced.

While specific embodiments of the present invention have been particularly shown and described above, it will be understood by those of ordinary skill in the art that various changes in form and detail may be made therein without departing from the spirit and scope of the present invention as defined by the following claims. The embodiments are provided for the purpose of description only and not for purposes of limitation. Therefore, the scope of the present invention is defined not by the detailed description above but only by the appended claims below.

What is claimed is:

1. A sensor capable of differentially detecting beta rays and gamma rays, the sensor comprising:
   a substrate on which at least one operational amplifier is mounted;
   a first blocking layer that blocks transmission of beta rays;
   a second blocking layer that blocks transmission of beta rays;
   a first photodiode that is disposed between the first blocking layer and the second blocking layer and is capable of detecting gamma rays; and
   a second photodiode that is disposed on the first blocking layer and is capable of detecting beta rays and gamma rays.

2. The sensor of claim 1, wherein at least one of the first blocking layer and the second blocking layer comprises a metal layer stacked on a silicon wafer or a printed circuit board (PCB).

3. The sensor of claim 2, wherein the metal layer is formed from any one of aluminum (Al), copper (Cu), gold (Au), and silver (Ag).

4. The sensor of claim 1, wherein the substrate comprises any one of a printed circuit board (PCB), a low temperature co-fired ceramic (LTCC) substrate, and a high temperature co-fired ceramic (HTCC) substrate.

5. The sensor of claim 1, further comprising:
at least one pad that is connected to the substrate,
wherein the at least one pad comprises a plurality of pads having a structure selected from a ball grid array (BGA), a land grid array (LGA), and a quad flat no-lead (QFN).

6. The sensor of claim 1, wherein the at least one operational amplifier is connected to the first photodiode and the second photodiode, and converts a current generated by the first photodiode and a current generated by the second photodiode into voltages.

7. The sensor of claim 1, further comprising:
a processor capable of determining whether at least one of the detected beta rays and the detected gamma rays exceeds a predetermined level.

8. A device comprising:
an output unit; and
a sensor capable of detecting radioactive rays, comprising:
a substrate on which at least one operational amplifier is mounted;
a first blocking layer that blocks transmission of beta rays;
a second blocking layer that blocks transmission of beta rays;
a first photodiode that is disposed between the first blocking layer and the second blocking layer and is capable of detecting gamma rays; and
a second photodiode that is disposed on the first blocking layer and is capable of detecting beta rays and gamma rays.

9. The device of claim 8, wherein the device is a mobile device.

10. The device of claim 8, wherein the device is a wearable device.

11. The device of claim 8, further comprising:
a processor capable of determining whether at least one of detected beta rays and detected gamma rays exceeds a predetermined level,
wherein the device further comprises an output unit outputs a warning signal when the detected beta rays and/or the detected gamma rays exceed the predetermined level.

12. The device of claim 11, wherein the output unit outputs safety information when the detected beta rays and/or the detected gamma rays exceed the predetermined level.

13. The device of claim 12, wherein the safety information comprises information about a shelter from radioactive exposure.

14. The device of claim 11, wherein the output unit outputs information about the amount of radioactive rays detected over a predetermined period of time.

15. A portable device comprising:
a package comprising:
a first sensor that is capable of differentially detecting beta rays and gamma rays included in rays incident on the portable device;
an interposer; and
a second sensor that is disposed on one side of the interposer and the first sensor is located on the other side of the interposer.

16. The portable device of claim 15, where the portable device is at least one of a wearable device and a mobile device.

* * * * *